United States Patent
Solis et al.

(10) Patent No.: US 9,609,014 B2
(45) Date of Patent: Mar. 28, 2017

(54) METHOD AND APPARATUS FOR PREVENTING INSERTION OF MALICIOUS CONTENT AT A NAMED DATA NETWORK ROUTER

(71) Applicant: CISCO SYSTEMS, INC., San Jose, CA (US)

(72) Inventors: Ignacio Solis, South San Francisco, CA (US); Marc E. Mosko, Santa Cruz, CA (US)

(73) Assignee: CISCO SYSTEMS, INC., San Jose, CA (US)

( * ) Notice: Subject to any disclaimer, the term of this patent is extended or adjusted under 35 U.S.C. 154(b) by 235 days.

(21) Appl. No.: 14/285,555

(22) Filed: May 22, 2014

(65) Prior Publication Data

US 2015/0341373 A1   Nov. 26, 2015

(51) Int. Cl.
*H04L 29/06* (2006.01)
*H04L 12/741* (2013.01)
(Continued)

(52) U.S. Cl.
CPC ........ *H04L 63/145* (2013.01); *H04L 12/6418* (2013.01); *H04L 45/00* (2013.01);
(Continued)

(58) Field of Classification Search
CPC ..... H04L 45/00; H04L 45/245; H04L 45/745; H04L 45/58
See application file for complete search history.

(56) References Cited

U.S. PATENT DOCUMENTS

| 817,441 A | 4/1906 | Niesz |
|---|---|---|
| 4,309,569 A | 1/1982 | Merkle |

(Continued)

FOREIGN PATENT DOCUMENTS

| CN | 103873371 | 6/2014 |
|---|---|---|
| DE | 1720277 A1 | 6/1967 |

(Continued)

OTHER PUBLICATIONS

Fall, K. et al., "DTN: an architectural retrospective", Selected areas in communications, IEEE Journal on, vol. 28, No. 5, Jun. 1, 2008, pp. 828-835.

(Continued)

*Primary Examiner* — Chirag R Patel
(74) *Attorney, Agent, or Firm* — Patent Capital Group

(57) ABSTRACT

An object-forwarding device can block a malicious Content Object from being inserted into an Interest's reverse path over a named data network. During operation, the device can receive a Content Object via a first interface, and can perform a lookup operation in a Pending Interest Table (PIT) to identify a PIT entry for an Interest associated with the Content Object. The device then determines, from the PIT entry, an egress interface used to forward the Interest. If the device determines that the egress interface of the PIT entry matches the first interface for the Content Object, the device forwards the Content Object via a return interface specified in the PIT entry. On the other hand, if the egress interface of the PIT entry does not match the first interface for the Content Object, the device can block the Content Object.

21 Claims, 7 Drawing Sheets

(51) Int. Cl.
*H04L 12/701* (2013.01)
*H04L 12/709* (2013.01)
*H04L 12/775* (2013.01)
*H04L 29/08* (2006.01)
*H04L 12/64* (2006.01)

(52) U.S. Cl.
CPC ............ *H04L 45/245* (2013.01); *H04L 45/58* (2013.01); *H04L 45/745* (2013.01); *H04L 63/1458* (2013.01); *H04L 63/1466* (2013.01); *H04L 67/327* (2013.01)

(56) References Cited

U.S. PATENT DOCUMENTS

| | | | |
|---|---|---|---|
| 4,921,898 A | 5/1990 | Lenney |
| 5,070,134 A | 12/1991 | Oyamada |
| 5,110,856 A | 5/1992 | Oyamada |
| 5,214,702 A | 5/1993 | Fischer |
| 5,377,354 A | 12/1994 | Scannell |
| 5,506,844 A | 4/1996 | Rao |
| 5,629,370 A | 5/1997 | Freidzon |
| 5,845,207 A | 12/1998 | Amin |
| 5,870,605 A | 2/1999 | Bracho |
| 6,047,331 A | 4/2000 | Medard |
| 6,052,683 A | 4/2000 | Irwin |
| 6,085,320 A | 7/2000 | Kaliski, Jr. |
| 6,091,724 A | 7/2000 | Chandra |
| 6,128,623 A | 10/2000 | Mattis |
| 6,128,627 A | 10/2000 | Mattis |
| 6,173,364 B1 | 1/2001 | Zenchelsky |
| 6,209,003 B1 | 3/2001 | Mattis |
| 6,226,618 B1 | 5/2001 | Downs |
| 6,233,617 B1 | 5/2001 | Rothwein |
| 6,233,646 B1 | 5/2001 | Hahm |
| 6,289,358 B1 | 9/2001 | Mattis |
| 6,292,880 B1 | 9/2001 | Mattis |
| 6,332,158 B1 | 12/2001 | Risley |
| 6,363,067 B1 | 3/2002 | Chung |
| 6,366,988 B1 | 4/2002 | Skiba |
| 6,574,377 B1 | 6/2003 | Cahill |
| 6,654,792 B1 | 11/2003 | Verma |
| 6,667,957 B1 | 12/2003 | Corson |
| 6,681,220 B1 | 1/2004 | Kaplan |
| 6,681,326 B2 | 1/2004 | Son |
| 6,732,273 B1 | 5/2004 | Byers |
| 6,769,066 B1 | 7/2004 | Botros |
| 6,772,333 B1 | 8/2004 | Brendel |
| 6,775,258 B1 | 8/2004 | vanValkenburg |
| 6,862,280 B1 | 3/2005 | Bertagna |
| 6,901,452 B1 | 5/2005 | Bertagna |
| 6,915,307 B1 | 7/2005 | Mattis |
| 6,917,985 B2 | 7/2005 | Madruga |
| 6,957,228 B1 | 10/2005 | Graser |
| 6,968,393 B1 | 11/2005 | Chen |
| 6,981,029 B1 | 12/2005 | Menditto |
| 7,007,024 B2 | 2/2006 | Zelenka |
| 7,013,389 B1 | 3/2006 | Srivastava |
| 7,031,308 B2 | 4/2006 | Garcia-Luna-Aceves |
| 7,043,637 B2 | 5/2006 | Bolosky |
| 7,061,877 B1 | 6/2006 | Gummalla |
| 7,080,073 B1 | 7/2006 | Jiang |
| RE39,360 E | 10/2006 | Aziz |
| 7,149,750 B2 | 12/2006 | Chadwick |
| 7,152,094 B1 | 12/2006 | Jannu |
| 7,177,646 B2 | 2/2007 | ONeill |
| 7,206,860 B2 | 4/2007 | Murakami |
| 7,206,861 B1 | 4/2007 | Callon |
| 7,210,326 B2 | 5/2007 | Kawamoto |
| 7,246,159 B2 | 7/2007 | Aggarwal |
| 7,257,837 B2 | 8/2007 | Xu |
| 7,287,275 B2 | 10/2007 | Moskowitz |
| 7,315,541 B1 | 1/2008 | Housel |
| 7,339,929 B2 | 3/2008 | Zelig |
| 7,350,229 B1 | 3/2008 | Lander |
| 7,362,727 B1 | 4/2008 | ONeill |
| 7,382,787 B1 | 6/2008 | Barnes |
| 7,395,507 B2 | 7/2008 | Robarts |
| 7,430,755 B1 | 9/2008 | Hughes |
| 7,444,251 B2 | 10/2008 | Nikovski |
| 7,466,703 B1 | 12/2008 | Arunachalam |
| 7,472,422 B1 | 12/2008 | Agbabian |
| 7,496,668 B2 | 2/2009 | Hawkinson |
| 7,509,425 B1 | 3/2009 | Rosenberg |
| 7,523,016 B1 | 4/2009 | Surdulescu |
| 7,542,471 B2 | 6/2009 | Samuels |
| 7,543,064 B2 | 6/2009 | Juncker |
| 7,552,233 B2 | 6/2009 | Raju |
| 7,555,482 B2 | 6/2009 | Korkus |
| 7,555,563 B2 | 6/2009 | Ott |
| 7,564,812 B1 | 7/2009 | Elliott |
| 7,567,547 B2 | 7/2009 | Mosko |
| 7,567,946 B2 | 7/2009 | Andreoli |
| 7,580,971 B1 | 8/2009 | Gollapudi |
| 7,623,535 B2 | 11/2009 | Guichard |
| 7,636,767 B2 | 12/2009 | Lev-Ran |
| 7,647,507 B1 | 1/2010 | Feng |
| 7,660,324 B2 | 2/2010 | Oguchi |
| 7,685,290 B2 | 3/2010 | Satapati |
| 7,698,463 B2 | 4/2010 | Ogier |
| 7,698,559 B1 | 4/2010 | Chaudhury |
| 7,769,887 B1 | 8/2010 | Bhattacharyya |
| 7,779,467 B2 | 8/2010 | Choi |
| 7,801,069 B2 | 9/2010 | Cheung |
| 7,801,177 B2 | 9/2010 | Luss |
| 7,816,441 B2 | 10/2010 | Elizalde |
| 7,831,733 B2 | 11/2010 | Sultan |
| 7,873,619 B1 | 1/2011 | Faibish |
| 7,908,337 B2 | 3/2011 | Garcia-Luna-Aceves |
| 7,924,837 B1 | 4/2011 | Shabtay |
| 7,953,014 B2 | 5/2011 | Toda |
| 7,953,885 B1 | 5/2011 | Devireddy |
| 7,979,912 B1 | 7/2011 | Roka |
| 8,000,267 B2 | 8/2011 | Solis |
| 8,010,691 B2 | 8/2011 | Kollmansberger |
| 8,069,023 B1 | 11/2011 | Frailong |
| 8,074,289 B1 | 12/2011 | Carpentier |
| 8,117,441 B2 | 2/2012 | Kurien |
| 8,160,069 B2 | 4/2012 | Jacobson |
| 8,204,060 B2 | 6/2012 | Jacobson |
| 8,214,364 B2 | 7/2012 | Bigus |
| 8,224,985 B2 | 7/2012 | Takeda |
| 8,225,057 B1 | 7/2012 | Zheng |
| 8,271,578 B2 | 9/2012 | Sheffi |
| 8,271,687 B2 | 9/2012 | Turner |
| 8,312,064 B1 | 11/2012 | Gauvin |
| 8,332,357 B1 | 12/2012 | Chung |
| 8,386,622 B2 | 2/2013 | Jacobson |
| 8,447,851 B1 | 5/2013 | Anderson |
| 8,462,781 B2 | 6/2013 | McGhee |
| 8,467,297 B2 | 6/2013 | Liu |
| 8,473,633 B2 | 6/2013 | Eardley |
| 8,553,562 B2 | 10/2013 | Allan |
| 8,572,214 B2 | 10/2013 | Garcia-Luna-Aceves |
| 8,654,649 B2 | 2/2014 | Vasseur |
| 8,665,757 B2 | 3/2014 | Kling |
| 8,667,172 B2 | 3/2014 | Ravindran |
| 8,677,451 B2 | 3/2014 | Bhimaraju |
| 8,688,619 B1 | 4/2014 | Ezick |
| 8,699,350 B1 | 4/2014 | Kumar |
| 8,718,055 B2 | 5/2014 | Vasseur |
| 8,750,820 B2 | 6/2014 | Allan |
| 8,761,022 B2 | 6/2014 | Chiabaut |
| 8,762,477 B2 | 6/2014 | Xie |
| 8,762,570 B2 | 6/2014 | Qian |
| 8,762,707 B2 | 6/2014 | Killian |
| 8,767,627 B2 | 7/2014 | Ezure |
| 8,817,594 B2 | 8/2014 | Gero |
| 8,826,381 B2 | 9/2014 | Kim |
| 8,832,302 B1 | 9/2014 | Bradford |
| 8,836,536 B2 | 9/2014 | Marwah |
| 8,861,356 B2 | 10/2014 | Kozat |
| 8,862,774 B2 | 10/2014 | Vasseur |
| 8,868,779 B2 | 10/2014 | ONeill |
| 8,874,842 B1 | 10/2014 | Kimmel |

(56) References Cited

U.S. PATENT DOCUMENTS

| | | | |
|---|---|---|---|
| 8,880,682 B2 | 11/2014 | Bishop | |
| 8,903,756 B2 | 12/2014 | Zhao | |
| 8,923,293 B2 | 12/2014 | Jacobson | |
| 8,934,496 B2 | 1/2015 | Vasseur | |
| 8,937,865 B1 | 1/2015 | Kumar | |
| 8,972,969 B2 | 3/2015 | Gaither | |
| 8,977,596 B2 | 3/2015 | Montulli | |
| 9,002,921 B2 | 4/2015 | Westphal | |
| 9,032,095 B1 * | 5/2015 | Traina | H04L 29/06 370/389 |
| 9,071,498 B2 | 6/2015 | Beser | |
| 9,112,895 B1 | 8/2015 | Lin | |
| 9,137,152 B2 | 9/2015 | Xie | |
| 9,253,087 B2 | 2/2016 | Zhang | |
| 9,270,598 B1 | 2/2016 | Oran | |
| 9,280,610 B2 | 3/2016 | Gruber | |
| 2002/0002680 A1 | 1/2002 | Carbajal | |
| 2002/0010795 A1 | 1/2002 | Brown | |
| 2002/0038296 A1 | 3/2002 | Margolus | |
| 2002/0048269 A1 | 4/2002 | Hong | |
| 2002/0054593 A1 | 5/2002 | Morohashi | |
| 2002/0077988 A1 | 6/2002 | Sasaki | |
| 2002/0078066 A1 | 6/2002 | Robinson | |
| 2002/0138551 A1 | 9/2002 | Erickson | |
| 2002/0152305 A1 | 10/2002 | Jackson | |
| 2002/0176404 A1 | 11/2002 | Girard | |
| 2002/0188605 A1 | 12/2002 | Adya | |
| 2002/0199014 A1 | 12/2002 | Yang | |
| 2003/0004621 A1 | 1/2003 | Bousquet | |
| 2003/0009365 A1 | 1/2003 | Tynan | |
| 2003/0033394 A1 | 2/2003 | Stine | |
| 2003/0046396 A1 | 3/2003 | Richter | |
| 2003/0046421 A1 | 3/2003 | Horvitz et al. | |
| 2003/0046437 A1 | 3/2003 | Eytchison | |
| 2003/0048793 A1 | 3/2003 | Pochon | |
| 2003/0051100 A1 | 3/2003 | Patel | |
| 2003/0061384 A1 | 3/2003 | Nakatani | |
| 2003/0074472 A1 | 4/2003 | Lucco | |
| 2003/0088696 A1 | 5/2003 | McCanne | |
| 2003/0097447 A1 | 5/2003 | Johnston | |
| 2003/0099237 A1 | 5/2003 | Mitra | |
| 2003/0140257 A1 | 7/2003 | Peterka | |
| 2003/0229892 A1 | 12/2003 | Sardera | |
| 2004/0024879 A1 | 2/2004 | Dingman | |
| 2004/0030602 A1 | 2/2004 | Rosenquist | |
| 2004/0064737 A1 | 4/2004 | Milliken | |
| 2004/0071140 A1 | 4/2004 | Jason | |
| 2004/0073617 A1 | 4/2004 | Milliken | |
| 2004/0073715 A1 | 4/2004 | Folkes | |
| 2004/0139230 A1 | 7/2004 | Kim | |
| 2004/0196783 A1 | 10/2004 | Shinomiya | |
| 2004/0218548 A1 | 11/2004 | Kennedy | |
| 2004/0221047 A1 | 11/2004 | Grover | |
| 2004/0225627 A1 | 11/2004 | Botros | |
| 2004/0233916 A1 | 11/2004 | Takeuchi | |
| 2004/0246902 A1 | 12/2004 | Weinstein | |
| 2004/0252683 A1 | 12/2004 | Kennedy | |
| 2005/0003832 A1 | 1/2005 | Osafune | |
| 2005/0028156 A1 | 2/2005 | Hammond | |
| 2005/0043060 A1 | 2/2005 | Brandenberg | |
| 2005/0050211 A1 | 3/2005 | Kaul | |
| 2005/0074001 A1 | 4/2005 | Mattes | |
| 2005/0132207 A1 | 6/2005 | Mourad | |
| 2005/0149508 A1 | 7/2005 | Deshpande | |
| 2005/0159823 A1 | 7/2005 | Hayes | |
| 2005/0198351 A1 | 9/2005 | Nog | |
| 2005/0249196 A1 | 11/2005 | Ansari | |
| 2005/0259637 A1 | 11/2005 | Chu | |
| 2005/0262217 A1 | 11/2005 | Nonaka | |
| 2005/0281288 A1 | 12/2005 | Banerjee | |
| 2005/0286535 A1 | 12/2005 | Shrum | |
| 2005/0289222 A1 | 12/2005 | Sahim | |
| 2006/0010249 A1 | 1/2006 | Sabesan | |
| 2006/0029102 A1 | 2/2006 | Abe | |
| 2006/0039379 A1 | 2/2006 | Abe | |
| 2006/0051055 A1 | 3/2006 | Ohkawa | |
| 2006/0072523 A1 | 4/2006 | Richardson | |
| 2006/0099973 A1 | 5/2006 | Nair | |
| 2006/0129514 A1 | 6/2006 | Watanabe | |
| 2006/0133343 A1 | 6/2006 | Huang | |
| 2006/0146686 A1 | 7/2006 | Kim | |
| 2006/0173831 A1 | 8/2006 | Basso | |
| 2006/0193295 A1 | 8/2006 | White | |
| 2006/0203804 A1 | 9/2006 | Whitmore | |
| 2006/0206445 A1 | 9/2006 | Andreoli | |
| 2006/0215684 A1 | 9/2006 | Capone | |
| 2006/0223504 A1 | 10/2006 | Ishak | |
| 2006/0242155 A1 | 10/2006 | Moore | |
| 2006/0256767 A1 | 11/2006 | Suzuki | |
| 2006/0268792 A1 | 11/2006 | Belcea | |
| 2007/0019619 A1 | 1/2007 | Foster | |
| 2007/0073888 A1 | 3/2007 | Madhok | |
| 2007/0094265 A1 | 4/2007 | Korkus | |
| 2007/0112880 A1 | 5/2007 | Yang | |
| 2007/0124412 A1 | 5/2007 | Narayanaswami | |
| 2007/0127457 A1 | 6/2007 | Mirtorabi | |
| 2007/0160062 A1 | 7/2007 | Morishita | |
| 2007/0162394 A1 | 7/2007 | Zager | |
| 2007/0171828 A1 | 7/2007 | Dalal | |
| 2007/0189284 A1 | 8/2007 | Kecskemeti | |
| 2007/0195765 A1 | 8/2007 | Heissenbuttel | |
| 2007/0204011 A1 | 8/2007 | Shaver | |
| 2007/0209067 A1 | 9/2007 | Fogel | |
| 2007/0239892 A1 | 10/2007 | Ott | |
| 2007/0240207 A1 | 10/2007 | Belakhdar | |
| 2007/0245034 A1 | 10/2007 | Retana | |
| 2007/0253418 A1 | 11/2007 | Shiri | |
| 2007/0255677 A1 | 11/2007 | Alexander | |
| 2007/0255699 A1 | 11/2007 | Sreenivas | |
| 2007/0255781 A1 | 11/2007 | Li | |
| 2007/0274504 A1 | 11/2007 | Maes | |
| 2007/0275701 A1 | 11/2007 | Jonker | |
| 2007/0276907 A1 | 11/2007 | Maes | |
| 2007/0283158 A1 | 12/2007 | Danseglio | |
| 2007/0294187 A1 | 12/2007 | Scherrer | |
| 2008/0005056 A1 | 1/2008 | Stelzig | |
| 2008/0005223 A1 | 1/2008 | Flake | |
| 2008/0010366 A1 | 1/2008 | Duggan | |
| 2008/0037420 A1 | 2/2008 | Tang | |
| 2008/0043989 A1 | 2/2008 | Furutono | |
| 2008/0046340 A1 | 2/2008 | Brown | |
| 2008/0059631 A1 | 3/2008 | Bergstrom | |
| 2008/0080440 A1 | 4/2008 | Yarvis | |
| 2008/0082662 A1 | 4/2008 | Dandliker | |
| 2008/0095159 A1 | 4/2008 | Suzuki | |
| 2008/0101357 A1 | 5/2008 | Iovanna | |
| 2008/0107034 A1 | 5/2008 | Jetcheva | |
| 2008/0107259 A1 | 5/2008 | Satou | |
| 2008/0123862 A1 | 5/2008 | Rowley | |
| 2008/0133583 A1 | 6/2008 | Artan | |
| 2008/0133755 A1 | 6/2008 | Pollack | |
| 2008/0151755 A1 | 6/2008 | Nishioka | |
| 2008/0159271 A1 | 7/2008 | Kutt | |
| 2008/0165775 A1 | 7/2008 | Das | |
| 2008/0186901 A1 | 8/2008 | Itagaki | |
| 2008/0200153 A1 | 8/2008 | Fitzpatrick | |
| 2008/0215669 A1 | 9/2008 | Gaddy | |
| 2008/0216086 A1 | 9/2008 | Tanaka | |
| 2008/0243992 A1 | 10/2008 | Jardetzky | |
| 2008/0250006 A1 | 10/2008 | Dettinger | |
| 2008/0256138 A1 | 10/2008 | Sim-Tang | |
| 2008/0256359 A1 | 10/2008 | Kahn | |
| 2008/0270618 A1 | 10/2008 | Rosenberg | |
| 2008/0271143 A1 | 10/2008 | Stephens | |
| 2008/0287142 A1 | 11/2008 | Keighran | |
| 2008/0288580 A1 | 11/2008 | Wang | |
| 2008/0291923 A1 | 11/2008 | Back | |
| 2008/0298376 A1 | 12/2008 | Takeda | |
| 2008/0320148 A1 | 12/2008 | Capuozzo | |
| 2009/0006659 A1 | 1/2009 | Collins | |
| 2009/0013324 A1 | 1/2009 | Gobara | |
| 2009/0022154 A1 | 1/2009 | Kiribe | |
| 2009/0024641 A1 | 1/2009 | Quigley | |
| 2009/0030978 A1 | 1/2009 | Johnson | |

(56) References Cited

U.S. PATENT DOCUMENTS

| | | |
|---|---|---|
| 2009/0037763 A1 | 2/2009 | Adhya |
| 2009/0052660 A1 | 2/2009 | Chen |
| 2009/0067429 A1 | 3/2009 | Nagai |
| 2009/0077184 A1 | 3/2009 | Brewer |
| 2009/0092043 A1 | 4/2009 | Lapuh |
| 2009/0097631 A1 | 4/2009 | Gisby |
| 2009/0103515 A1 | 4/2009 | Pointer |
| 2009/0113068 A1 | 4/2009 | Fujihira |
| 2009/0116393 A1 | 5/2009 | Hughes |
| 2009/0117922 A1 | 5/2009 | Bell |
| 2009/0132662 A1 | 5/2009 | Sheridan |
| 2009/0135728 A1 | 5/2009 | Shen |
| 2009/0144300 A1 | 6/2009 | Chatley |
| 2009/0157887 A1 | 6/2009 | Froment |
| 2009/0185745 A1 | 7/2009 | Momosaki |
| 2009/0193101 A1 | 7/2009 | Munetsugu |
| 2009/0198832 A1 | 8/2009 | Shah |
| 2009/0222344 A1 | 9/2009 | Greene |
| 2009/0228593 A1 | 9/2009 | Takeda |
| 2009/0254572 A1 | 10/2009 | Redlich |
| 2009/0268905 A1 | 10/2009 | Matsushima |
| 2009/0274158 A1 | 11/2009 | Sharp |
| 2009/0276396 A1 | 11/2009 | Gorman |
| 2009/0285209 A1 | 11/2009 | Stewart |
| 2009/0287835 A1 | 11/2009 | Jacobson |
| 2009/0287853 A1 | 11/2009 | Carson |
| 2009/0288076 A1 | 11/2009 | Johnson |
| 2009/0288143 A1 | 11/2009 | Stebila |
| 2009/0288163 A1 | 11/2009 | Jacobson |
| 2009/0292743 A1 | 11/2009 | Bigus |
| 2009/0293121 A1 | 11/2009 | Bigus |
| 2009/0296719 A1 | 12/2009 | Maier |
| 2009/0300079 A1 | 12/2009 | Shitomi |
| 2009/0300407 A1 | 12/2009 | Kamath |
| 2009/0300512 A1 | 12/2009 | Ahn |
| 2009/0307333 A1 | 12/2009 | Welingkar |
| 2009/0323632 A1 | 12/2009 | Nix |
| 2010/0005061 A1 | 1/2010 | Basco |
| 2010/0027539 A1 | 2/2010 | Beverly |
| 2010/0046546 A1 | 2/2010 | Ram |
| 2010/0057929 A1 | 3/2010 | Merat |
| 2010/0058346 A1 | 3/2010 | Narang |
| 2010/0088370 A1 | 4/2010 | Wu |
| 2010/0094767 A1 | 4/2010 | Miltonberger |
| 2010/0094876 A1 | 4/2010 | Huang |
| 2010/0098093 A1 | 4/2010 | Ejzak |
| 2010/0100465 A1 | 4/2010 | Cooke |
| 2010/0103870 A1 | 4/2010 | Garcia-Luna-Aceves |
| 2010/0124191 A1 | 5/2010 | Vos |
| 2010/0125911 A1 | 5/2010 | Bhaskaran |
| 2010/0131660 A1 | 5/2010 | Dec |
| 2010/0150155 A1 | 6/2010 | Napierala |
| 2010/0165976 A1 | 7/2010 | Khan |
| 2010/0169478 A1 | 7/2010 | Saha |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0185753 A1 | 7/2010 | Liu |
| 2010/0195653 A1 | 8/2010 | Jacobson |
| 2010/0195654 A1 | 8/2010 | Jacobson |
| 2010/0195655 A1 | 8/2010 | Jacobson |
| 2010/0217874 A1 | 8/2010 | Anantharaman |
| 2010/0217985 A1 | 8/2010 | Fahrny |
| 2010/0232402 A1 | 9/2010 | Przybysz |
| 2010/0232439 A1 | 9/2010 | Dham |
| 2010/0235516 A1 | 9/2010 | Nakamura |
| 2010/0246549 A1 | 9/2010 | Zhang |
| 2010/0250497 A1 | 9/2010 | Redlich |
| 2010/0250939 A1 | 9/2010 | Adams |
| 2010/0257149 A1 | 10/2010 | Cognigni |
| 2010/0268782 A1 | 10/2010 | Zombek |
| 2010/0272107 A1 | 10/2010 | Papp |
| 2010/0281263 A1 | 11/2010 | Ugawa |
| 2010/0284309 A1 | 11/2010 | Allan |
| 2010/0284404 A1 | 11/2010 | Gopinath |
| 2010/0293293 A1 | 11/2010 | Beser |
| 2010/0322249 A1 | 12/2010 | Thathapudi |
| 2011/0013637 A1 | 1/2011 | Xue |
| 2011/0019674 A1 | 1/2011 | Iovanna |
| 2011/0022812 A1 | 1/2011 | vanderLinden |
| 2011/0029952 A1 | 2/2011 | Harrington |
| 2011/0055392 A1 | 3/2011 | Shen |
| 2011/0055921 A1 | 3/2011 | Narayanaswamy |
| 2011/0060716 A1 | 3/2011 | Forman |
| 2011/0060717 A1 | 3/2011 | Forman |
| 2011/0090908 A1 | 4/2011 | Jacobson |
| 2011/0106755 A1 | 5/2011 | Hao |
| 2011/0131308 A1 | 6/2011 | Eriksson |
| 2011/0137919 A1 | 6/2011 | Ryu |
| 2011/0145597 A1 | 6/2011 | Yamaguchi |
| 2011/0145858 A1 | 6/2011 | Philpott |
| 2011/0149858 A1 | 6/2011 | Hwang |
| 2011/0153840 A1 | 6/2011 | Narayana |
| 2011/0158122 A1 | 6/2011 | Murphy |
| 2011/0161408 A1 | 6/2011 | Kim |
| 2011/0202609 A1 | 8/2011 | Chaturvedi |
| 2011/0219093 A1 | 9/2011 | Ragunathan |
| 2011/0219427 A1 | 9/2011 | Hito |
| 2011/0219727 A1 | 9/2011 | May |
| 2011/0225293 A1 | 9/2011 | Rathod |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Venkata Subramanian |
| 2011/0265159 A1 | 10/2011 | Ronda |
| 2011/0265174 A1 | 10/2011 | Thornton |
| 2011/0271007 A1 | 11/2011 | Wang |
| 2011/0280214 A1 | 11/2011 | Lee |
| 2011/0286457 A1 | 11/2011 | Ee |
| 2011/0286459 A1 | 11/2011 | Rembarz |
| 2011/0295783 A1 | 12/2011 | Zhao |
| 2011/0299454 A1 | 12/2011 | Krishnaswamy |
| 2012/0011170 A1 | 1/2012 | Elad |
| 2012/0011551 A1 | 1/2012 | Levy |
| 2012/0023113 A1 | 1/2012 | Ferren |
| 2012/0036180 A1 | 2/2012 | Thornton |
| 2012/0045064 A1 | 2/2012 | Rembarz |
| 2012/0047361 A1 | 2/2012 | Erdmann |
| 2012/0066727 A1 | 3/2012 | Nozoe |
| 2012/0106339 A1 | 5/2012 | Mishra |
| 2012/0110159 A1 | 5/2012 | Richardson |
| 2012/0114313 A1 | 5/2012 | Phillips |
| 2012/0120803 A1 | 5/2012 | Farkas |
| 2012/0127994 A1 | 5/2012 | Ko |
| 2012/0136676 A1 | 5/2012 | Goodall |
| 2012/0136936 A1 | 5/2012 | Quintuna |
| 2012/0136945 A1 | 5/2012 | Lee |
| 2012/0137367 A1 | 5/2012 | Dupont |
| 2012/0141093 A1 | 6/2012 | Yamaguchi |
| 2012/0155464 A1 | 6/2012 | Kim |
| 2012/0158973 A1 | 6/2012 | Jacobson |
| 2012/0163373 A1 | 6/2012 | Lo |
| 2012/0166433 A1 | 6/2012 | Tseng |
| 2012/0170913 A1 | 7/2012 | Isozaki |
| 2012/0179653 A1 | 7/2012 | Araki |
| 2012/0197690 A1 | 8/2012 | Agulnek |
| 2012/0198048 A1 | 8/2012 | Ioffe |
| 2012/0221150 A1 | 8/2012 | Arensmeier |
| 2012/0224487 A1 | 9/2012 | Hui |
| 2012/0226902 A1 | 9/2012 | Kim |
| 2012/0257500 A1 | 10/2012 | Lynch |
| 2012/0284791 A1 | 11/2012 | Miller |
| 2012/0290669 A1 | 11/2012 | Parks |
| 2012/0290919 A1 | 11/2012 | Melnyk |
| 2012/0291102 A1 | 11/2012 | Cohen |
| 2012/0300669 A1 | 11/2012 | Zahavi |
| 2012/0307629 A1 | 12/2012 | Vasseur |
| 2012/0314580 A1 | 12/2012 | Hong |
| 2012/0317307 A1 | 12/2012 | Ravindran |
| 2012/0322422 A1 | 12/2012 | Frecks |
| 2012/0323933 A1 | 12/2012 | He |
| 2012/0331112 A1 | 12/2012 | Chatani |
| 2013/0024560 A1 | 1/2013 | Vasseur |
| 2013/0041982 A1 | 2/2013 | Shi |

(56) References Cited

U.S. PATENT DOCUMENTS

| | | |
|---|---|---|
| 2013/0051392 A1 | 2/2013 | Filsfils |
| 2013/0054971 A1 | 2/2013 | Yamaguchi |
| 2013/0060962 A1 | 3/2013 | Wang |
| 2013/0061084 A1 | 3/2013 | Barton |
| 2013/0066823 A1 | 3/2013 | Sweeney |
| 2013/0073552 A1 | 3/2013 | Rangwala |
| 2013/0073882 A1 | 3/2013 | Inbaraj |
| 2013/0074155 A1 | 3/2013 | Huh |
| 2013/0090942 A1 | 4/2013 | Robinson |
| 2013/0091539 A1 | 4/2013 | Khurana |
| 2013/0110987 A1 | 5/2013 | Kim |
| 2013/0111063 A1 | 5/2013 | Lee |
| 2013/0128786 A1 | 5/2013 | Sultan |
| 2013/0132719 A1 | 5/2013 | Kobayashi |
| 2013/0139245 A1 | 5/2013 | Thomas |
| 2013/0151584 A1 | 6/2013 | Westphal |
| 2013/0151646 A1 | 6/2013 | Chidambaram |
| 2013/0152070 A1 | 6/2013 | Bhullar |
| 2013/0163426 A1 | 6/2013 | Beliveau |
| 2013/0166668 A1 | 6/2013 | Byun |
| 2013/0173822 A1 | 7/2013 | Hong |
| 2013/0182568 A1 | 7/2013 | Lee |
| 2013/0182931 A1 | 7/2013 | Fan |
| 2013/0185406 A1 | 7/2013 | Choi |
| 2013/0191412 A1 | 7/2013 | Kitamura |
| 2013/0197698 A1 | 8/2013 | Shah |
| 2013/0198119 A1 | 8/2013 | Eberhardt, III |
| 2013/0212185 A1 | 8/2013 | Pasquero |
| 2013/0219038 A1 | 8/2013 | Lee |
| 2013/0219081 A1 | 8/2013 | Qian |
| 2013/0219478 A1 | 8/2013 | Mahamuni |
| 2013/0223237 A1 | 8/2013 | Hui |
| 2013/0227048 A1 | 8/2013 | Xie |
| 2013/0227114 A1 | 8/2013 | Vasseur |
| 2013/0227166 A1 | 8/2013 | Ravindran |
| 2013/0242996 A1 | 9/2013 | Varvello |
| 2013/0250809 A1 | 9/2013 | Hui |
| 2013/0262365 A1 | 10/2013 | Dolbear |
| 2013/0262698 A1 | 10/2013 | Schwan |
| 2013/0282854 A1 | 10/2013 | Jang |
| 2013/0282860 A1 | 10/2013 | Zhang |
| 2013/0282920 A1 | 10/2013 | Zhang |
| 2013/0304758 A1 | 11/2013 | Gruber |
| 2013/0304937 A1 | 11/2013 | Lee |
| 2013/0325888 A1 | 12/2013 | Oneppo |
| 2013/0329696 A1 | 12/2013 | Xu |
| 2013/0332971 A1 | 12/2013 | Fisher |
| 2013/0336103 A1 | 12/2013 | Vasseur |
| 2013/0336323 A1 | 12/2013 | Srinivasan |
| 2013/0339481 A1 | 12/2013 | Hong |
| 2013/0343408 A1 | 12/2013 | Cook |
| 2014/0003232 A1 | 1/2014 | Guichard |
| 2014/0003424 A1 | 1/2014 | Matsuhira |
| 2014/0006354 A1 | 1/2014 | Parkison |
| 2014/0006565 A1 | 1/2014 | Muscariello |
| 2014/0029445 A1 | 1/2014 | Hui |
| 2014/0032714 A1 | 1/2014 | Liu |
| 2014/0033193 A1 | 1/2014 | Palaniappan |
| 2014/0040505 A1 | 2/2014 | Barton |
| 2014/0040628 A1 | 2/2014 | Fort |
| 2014/0043987 A1 | 2/2014 | Watve |
| 2014/0047513 A1 | 2/2014 | vantNoordende |
| 2014/0074730 A1 | 3/2014 | Arensmeier |
| 2014/0075567 A1 | 3/2014 | Raleigh |
| 2014/0082135 A1 | 3/2014 | Jung |
| 2014/0082661 A1 | 3/2014 | Krahnstoever |
| 2014/0089454 A1 | 3/2014 | Jeon |
| 2014/0096249 A1 | 4/2014 | Dupont |
| 2014/0098685 A1 | 4/2014 | Shattil |
| 2014/0108313 A1 | 4/2014 | Heidasch |
| 2014/0108474 A1 | 4/2014 | David |
| 2014/0115037 A1 | 4/2014 | Liu |
| 2014/0122587 A1 | 5/2014 | Petker et al. |
| 2014/0129736 A1 | 5/2014 | Yu |
| 2014/0136814 A1 | 5/2014 | Stark |
| 2014/0140348 A1 | 5/2014 | Perlman |
| 2014/0143370 A1 | 5/2014 | Vilenski |
| 2014/0146819 A1 | 5/2014 | Bae |
| 2014/0149733 A1 | 5/2014 | Kim |
| 2014/0156396 A1 | 6/2014 | deKozan |
| 2014/0165207 A1 | 6/2014 | Engel |
| 2014/0172783 A1 | 6/2014 | Suzuki |
| 2014/0172981 A1 | 6/2014 | Kim |
| 2014/0173034 A1 | 6/2014 | Liu |
| 2014/0173076 A1 | 6/2014 | Ravindran |
| 2014/0181140 A1 | 6/2014 | Kim |
| 2014/0192677 A1 | 7/2014 | Chew |
| 2014/0192717 A1 | 7/2014 | Liu |
| 2014/0195328 A1 | 7/2014 | Ferens |
| 2014/0195641 A1 | 7/2014 | Wang |
| 2014/0195666 A1 | 7/2014 | Dumitriu |
| 2014/0204945 A1 | 7/2014 | Byun |
| 2014/0214942 A1 | 7/2014 | Ozonat |
| 2014/0233575 A1 | 8/2014 | Xie |
| 2014/0237085 A1 | 8/2014 | Park |
| 2014/0237095 A1 | 8/2014 | Bevilacqua-Linn |
| 2014/0245359 A1 | 8/2014 | DeFoy |
| 2014/0254595 A1 | 9/2014 | Luo |
| 2014/0280823 A1 | 9/2014 | Varvello |
| 2014/0281489 A1 | 9/2014 | Peterka |
| 2014/0281505 A1 | 9/2014 | Zhang |
| 2014/0282816 A1 | 9/2014 | Xie |
| 2014/0289325 A1 | 9/2014 | Solis |
| 2014/0289790 A1 | 9/2014 | Wilson |
| 2014/0298248 A1 | 10/2014 | Kang |
| 2014/0314093 A1 | 10/2014 | You |
| 2014/0337276 A1 | 11/2014 | Iordanov |
| 2014/0365550 A1 | 12/2014 | Jang |
| 2015/0006896 A1 | 1/2015 | Franck |
| 2015/0018770 A1 | 1/2015 | Baran |
| 2015/0032892 A1 | 1/2015 | Narayanan |
| 2015/0033365 A1 | 1/2015 | Mellor |
| 2015/0039890 A1 | 2/2015 | Khosravi |
| 2015/0063802 A1 | 3/2015 | Bahadur |
| 2015/0089081 A1 | 3/2015 | Thubert |
| 2015/0095481 A1 | 4/2015 | Ohnishi |
| 2015/0095514 A1 | 4/2015 | Yu |
| 2015/0120663 A1 | 4/2015 | LeScouarnec |
| 2015/0169758 A1 | 6/2015 | Assom |
| 2015/0188770 A1 | 7/2015 | Naiksatam |
| 2015/0195149 A1 | 7/2015 | Vasseur |
| 2015/0207633 A1 | 7/2015 | Ravindran |
| 2015/0207864 A1 | 7/2015 | Wilson |
| 2015/0279348 A1 | 10/2015 | Cao |
| 2015/0288755 A1 | 10/2015 | Mosko |
| 2015/0312300 A1 | 10/2015 | Mosko |
| 2015/0349961 A1 | 12/2015 | Mosko |
| 2015/0372903 A1 | 12/2015 | Hui |
| 2015/0381546 A1 | 12/2015 | Mahadevan |
| 2016/0019275 A1 | 1/2016 | Mosko |
| 2016/0021172 A1 | 1/2016 | Mahadevan |
| 2016/0062840 A1 | 3/2016 | Scott |
| 2016/0110466 A1 | 4/2016 | Uzun |
| 2016/0171184 A1 | 6/2016 | Solis |

FOREIGN PATENT DOCUMENTS

| | | |
|---|---|---|
| DE | 19620817 A1 | 11/1997 |
| EP | 0295727 A2 | 12/1988 |
| EP | 0757065 A2 | 7/1996 |
| EP | 1077422 A2 | 2/2001 |
| EP | 1383265 A1 | 1/2004 |
| EP | 1384729 A1 | 1/2004 |
| EP | 1473889 A2 | 11/2004 |
| EP | 2120402 | 11/2009 |
| EP | 2120419 | 11/2009 |
| EP | 2120419 A2 | 11/2009 |
| EP | 2124415 A2 | 11/2009 |
| EP | 2214357 A1 | 8/2010 |
| EP | 2299754 A1 | 3/2011 |
| EP | 2323346 | 5/2011 |
| EP | 2552083 | 1/2013 |
| EP | 2214356 | 5/2016 |
| WO | 03005288 A2 | 1/2003 |

(56) References Cited

FOREIGN PATENT DOCUMENTS

| WO | 03042254 A1 | 5/2003 |
|---|---|---|
| WO | 03049369 A2 | 6/2003 |
| WO | 03091297 A1 | 11/2003 |
| WO | 2007113180 A1 | 10/2007 |
| WO | 2007122620 | 11/2007 |
| WO | 2007144388 A1 | 12/2007 |
| WO | 2011049890 A1 | 4/2011 |
| WO | 2012077073 A1 | 6/2012 |
| WO | 2013123410 | 8/2013 |
| WO | 2015084327 | 6/2015 |

OTHER PUBLICATIONS

Gritter, M. et al., 'An Architecture for content routing support in the Internet', Proceedings of 3rd Usenix Symposium on Internet Technologies and Systems, 2001, pp. 37-48.
"CCNx," http://ccnx.org/. downloaded Mar. 11, 2015.
"Content Delivery Network", Wikipedia, Dec. 10, 2011, http://en.wikipedia.org/w/index.php?title=Content_delivery_network&oldid=465077460.
"Digital Signature" archived on Aug. 31, 2009 at http://web.archive.org/web/20090831170721/http://en.wikipedia.org/wiki/Digital_signature.
"Introducing JSON," http://www.json.org/. downloaded Mar. 11, 2015.
"Microsoft PlayReady," http://www.microsoft.com/playready/. downloaded Mar. 11, 2015.
"Pursuing a pub/sub internet (PURSUIT)," http://www.fp7-pursuit.ew/PursuitWeb/. downloaded Mar. 11, 2015.
"The FP7 4WARD project," http://www.4ward-project.eu/. downloaded Mar. 11, 2015.
A. Broder and A. Karlin, "Multilevel Adaptive Hashing", Jan. 1990, pp. 43-53.
Detti, Andrea, et al. "CONET: a content centric inter-networking architecture." Proceedings of the ACM SIGCOMM workshop on Information-centric networking. ACM, 2011.
A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.
Afanasyev, Alexander, et al. "Interest flooding attack and countermeasures in Named Data Networking." IFIP Networking Conference, 2013. IEEE, 2013.
Ao-Jan Su, David R. Choffnes, Aleksandar Kuzmanovic, and Fabian E. Bustamante. Drafting Behind Akamai: Inferring Network Conditions Based on CDN Redirections. IEEE/ACM Transactions on Networking {Feb. 2009).
B. Ahlgren et al., 'A Survey of Information-centric Networking' IEEE Commun. Magazine, Jul. 2012, pp. 26-36.
B. Lynn. The Pairing-Based Cryptography Library, http://crypto.stanford.edu/pbc/.
Bari, MdFaizul, et al. 'A survey of naming and routing in information-centric networks.' Communications Magazine, IEEE 50.12 (2012): 44-53.
Baugher, Mark et al., "Self-Verifying Names for Read-Only Named Data", 2012 IEEE Conference on Computer Communications Workshops (INFOCOM WKSHPS), Mar. 2012, pp. 274-279.
Brambley, Michael, A novel, low-cost, reduced-sensor approach for providing smart remote monitoring and diagnostics for packaged air conditioners and heat pumps. Pacific Northwest National Laboratory, 2009.
C. Gentry and A. Silverberg. Hierarchical ID-Based Cryptography. Advances in Cryptology—ASIACRYPT 2002. Springer Berlin Heidelberg (2002).
C.A. Wood and E. Uzun, "Flexible end-to-end content security in CCN," in Proc. IEEE CCNC 2014, Las Vegas, CA, USA, Jan. 2014.
Carzaniga, Antonio, Matthew J. Rutherford, and Alexander L. Wolf. 'A routing scheme for content-based networking.' INFOCOM 2004.
Twenty-third Annual Joint Conference of the IEEE Computer and Communications Societies. vol. 2. IEEE, 2004.
Cho, Jin-Hee, Ananthram Swami, and Ray Chen. "A survey on trust management for mobile ad hoc networks." Communications Surveys & Tutorials, IEEE 13.4 (2011): 562-583.
Compagno, Alberto, et al. "Poseidon: Mitigating interest flooding DDoS attacks in named data networking." Local Computer Networks (LCN), 2013 IEEE 38th Conference on. IEEE, 2013.
Conner, William, et al. "A trust management framework for service-oriented environments." Proceedings of the 18th international conference on World wide web. ACM, 2009.
Content Centric Networking Project (CCN) [online], http://ccnx.org/releases/latest/doc/technical/, Downloaded Mar. 9, 2015.
Content Mediator Architecture for Content-aware Networks (COMET) Project [online], http://www.comet-project.org/, Downloaded Mar. 9, 2015.
D. Boneh, C. Gentry, and B. Waters, 'Collusion resistant broadcast encryption with short ciphertexts and private keys,' in Proc. CRYPTO 2005, Santa Barbara, CA, USA, Aug. 2005, pp. 1-19.
D. Boneh and M. Franklin. Identity-Based Encryption from the Weil Pairing. Advances in Cryptology—CRYPTO 2001, vol. 2139, Springer Berlin Heidelberg (2001).
D.K. Smetters, P. Golle, and J.D. Thornton, "CCNx access control specifications," PARC, Tech. Rep., Jul. 2010.
Dabirmoghaddam, Ali, Maziar Mirzazad Barijough, and J. J. Garcia-Luna-Aceves. 'Understanding optimal caching and opportunistic caching at the edge of information-centric networks.' Proceedings of the 1st international conference on Information-centric networking. ACM, 2014.
Detti et al., "Supporting the Web with an information centric network that routes by name", Aug. 2012, Computer Networks 56, pp. 3705-3702.
Dijkstra, Edsger W., and Carel S. Scholten. 'Termination detection for diffusing computations.' Information Processing Letters 11.1 (1980): 1-4.
Dijkstra, Edsger W., Wim HJ Feijen, and A_J M. Van Gasteren. "Derivation of a termination detection algorithm for distributed computations." Control Flow and Data Flow: concepts of distributed programming. Springer Berlin Heidelberg, 1986. 507-512.
E. Rescorla and N. Modadugu, "Datagram transport layer security," IETF RFC 4347, Apr. 2006.
E.W. Dijkstra, W. Feijen, and A.J.M. Van Gasteren, "Derivation of a Termination Detection Algorithm for Distributed Computations," Information Processing Letter, vol. 16, No. 5, 1983.
Fayazbakhsh, S. K., Lin, Y., Tootoonchian, A., Ghodsi, A., Koponen, T., Maggs, B., & Shenker, S. {Aug. 2013). Less pain, most of the gain: Incrementally deployable ICN. In ACM SIGCOMM Computer Communication Review (vol. 43, No. 4, pp. 147-158). ACM.
G. Ateniese, K. Fu, M. Green, and S. Hohenberger. Improved Proxy Reencryption Schemes with Applications to Secure Distributed Storage. In the 12th Annual Network and Distributed System Security Symposium (2005).
G. Tyson, S. Kaune, S. Miles, Y. El-Khatib, A. Mauthe, and A. Taweel, "A trace-driven analysis of caching in content-centric networks," in Proc. IEEE ICCCN 2012, Munich, Germany, Jul.-Aug. 2012, pp. 1-7.
G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.
G. Xylomenos et al., "A Survey of Information-centric Networking Research," IEEE Communication Surveys and Tutorials, Jul. 2013.
Garcia, Humberto E., Wen-Chiao Lin, and Semyon M. Meerkov. "A resilient condition assessment monitoring system." Resilient Control Systems (ISRCS), 2012 5th International Symposium on. IEEE, 2012.
Garcia-Luna-Aceves, Jose J. 'A unified approach to loop-free routing using distance vectors or link states.' ACM SIGCOMM Computer Communication Review. vol. 19. No. 4. ACM, 1989.
Garcia-Luna-Aceves, Jose J. 'Name-Based Content Routing in Information Centric Networks Using Distance Information' Proc ACM ICN 2014, Sep. 2014.

(56) References Cited

OTHER PUBLICATIONS

Ghali, Cesar, GeneTsudik, and Ersin Uzun. "Needle in a Haystack: Mitigating Content Poisoning in Named-Data Networking." Proceedings of NDSS Workshop on Security of Emerging Networking Technologies (SENT). 2014.
Ghodsi, Ali, et al. "Information-centric networking: seeing the forest for the trees." Proceedings of the 10th ACM Workshop on Hot Topics in Networks. ACM, 2011.
Ghodsi, Ali, et al. "Naming in content-oriented architectures." Proceedings of the ACM SIGCOMM workshop on Information-centric networking. ACM, 2011.
Gupta, Anjali, Barbara Liskov, and Rodrigo Rodrigues. "Efficient Routing for Peer-to-Peer Overlays." NSDI. vol. 4. 2004.
H. Xiong, X. Zhang, W. Zhu, and D. Yao. CloudSeal: End-to-End Content Protection in Cloud-based Storage and Delivery Services. Security and Privacy in Communication Networks. Springer Berlin Heidelberg (2012).
Heckerman, David, John S. Breese, and Koos Rommelse. "Decision-Theoretic Troubleshooting." Communications of the ACM. 1995.
Heinemeier, Kristin, et al. "Uncertainties in Achieving Energy Savings from HVAC Maintenance Measures in the Field." ASHRAE Transactions 118.Part 2 {2012}.
Herlich, Matthias et al., "Optimizing Energy Efficiency for Bulk Transfer Networks", Apr. 13, 2010, pp. 1-3, retrieved for the Internet: URL:http://www.cs.uni-paderborn.de/fileadmin/informationik/ag-karl/publications/miscellaneous/optimizing.pdf (retrieved on Mar. 9, 2012).
Hogue et al., 'NLSR: Named-data Link State Routing Protocol', Aug. 12, 2013, ICN 2013, pp. 15-20.
https://code.google.com/p/ccnx-trace/.
I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.
Intanagonwiwat, Chalermek, Ramesh Govindan, and Deborah Estrin. 'Directed diffusion: a scalable and robust communication paradigm for sensor networks.' Proceedings of the 6th annual international conference on Mobile computing and networking. ACM, 2000.
J. Aumasson and D. Bernstein, "SipHash: a fast short-input PRF", Sep. 18, 2012.
J. Bethencourt, A, Sahai, and B. Waters, 'Ciphertext-policy attribute-based encryption,' in Proc. IEEE Security & Privacy 2007, Berkeley, CA, USA, May 2007, pp. 321-334.
J. Hur, "Improving security and efficiency in attribute-based data sharing," IEEE Trans. Knowledge Data Eng., vol. 25, No. 10, pp. 2271-2282, Oct. 2013.
J. Shao and Z. Cao. CCA-Secure Proxy Re-Encryption without Pairings. Public Key Cryptography. Springer Lecture Notes in Computer Sciencevol. 5443 (2009).
V. Jacobson et al., 'Networking Named Content,' Proc. IEEE CoNEXT '09, Dec. 2009.
Jacobson, Van et al., "Content-Centric Networking, Whitepaper Describing Future Assurable Global Networks", Palo Alto Research Center, Inc., Jan. 30, 2007, pp. 1-9.
Jacobson, Van et al. 'VoCCN: Voice Over Content-Centric Networks.' Dec. 1, 2009. ACM ReArch'09.
Jacobson et al., "Custodian-Based Information Sharing," Jul. 2012, IEEE Communications Magazine: vol. 50 Issue 7 (p. 3843).
Ji, Kun, et al. "Prognostics enabled resilient control for model-based building automation systems." Proceedings of the 12th Conference of International Building Performance Simulation Association. 2011.
K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.
Katipamula, Srinivas, and Michael R. Brambley. "Review article: methods for fault detection, diagnostics, and prognostics for building systemsa review, Part I." HVAC&R Research 11.1 (2005): 3-25.
Katipamula, Srinivas, and Michael R. Brambley. "Review article: methods for fault detection, diagnostics, and prognostics for building systemsa review, Part II." HVAC&R Research 11.2 (2005): 169-187.
Koponen, Teemu et al., "A Data-Oriented (and Beyond) Network Architecture", SIGCOMM '07, Aug. 27-31, 2007, Kyoto, Japan, XP-002579021, p. 181-192.
L. Wang et al., 'OSPFN: An OSPF Based Routing Protocol for Named Data Networking,' Technical Report NDN-0003, 2012.
L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.
Li, Wenjia, Anupam Joshi, and Tim Finin. "Coping with node misbehaviors in ad hoc networks: A multi-dimensional trust management approach." Mobile Data Management (MDM), 2010 Eleventh International Conference on. IEEE, 2010.
Lopez, Javier, et al. "Trust management systems for wireless sensor networks: Best practices." Computer Communications 33.9 (2010): 1086-1093.
M. Blaze, G. Bleumer, and M. Strauss, 'Divertible protocols and atomic prosy cryptography,' in Proc. EUROCRYPT 1998, Espoo, Finland, May-Jun. 1998, pp. 127-144.
M. Green and G. Ateniese, "Identity-based proxy re-encryption," in Proc. ACNS 2007, Zhuhai, China, Jun. 2007, pp. 288-306.
M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.
M. Naor and B. Pinkas "Efficient trace and revoke schemes," in Proc. FC 2000, Anguilla, British West Indies, Feb. 2000, pp. 1-20.
M. Nystrom, S. Parkinson, A. Rusch, and M. Scott, "PKCS#12: Personal information exchange syntax v. 1.1," IETF RFC 7292, K. Moriarty, Ed., Jul. 2014.
M. Parsa and J.J. Garcia-Luna-Aceves, "A Protocol for Scalable Loop-free Multicast Routing." IEEE JSAC, Apr. 1997.
M. Walfish, H. Balakrishnan, and S. Shenker, "Untangling the web from DNS," in Proc. USENIX NSDI 2004, Oct. 2010, pp. 735-737.
Mahadevan, Priya, et al. "Orbis: rescaling degree correlations to generate annotated internet topologies." ACM SIGCOMM Computer Communication Review. vol. 37. No. 4. ACM, 2007.
Mahadevan, Priya, et al. "Systematic topology analysis and generation using degree correlations." ACM SIGCOMM Computer Communication Review. vol. 36. No. 4. ACM, 2006.
Matocha, Jeff, and Tracy Camp. 'A taxonomy of distributed termination detection algorithms.' Journal of Systems and Software 43.3 (1998): 207-221.
Matteo Varvello et al., "Caesar: A Content Router for High Speed Forwarding", ICN 2012, Second Edition on Information-Centric Networking, New York, Aug. 2012.
McWilliams, Jennifer A., and Iain S. Walker. "Home Energy Article: A Systems Approach to Retrofitting Residential HVAC Systems." Lawrence Berkeley National Laboratory (2005).
Merindol et al., "An efficient algorithm to enable path diversity in link state routing networks", Jan. 10, Computer Networks 55 (2011), pp. 1132-1140.
Mobility First Project [online], http://mobilityfirst.winlab.rutgers.edu/, Downloaded Mar. 9, 2015.
Narasimhan, Sriram, and Lee Brownston. "HyDE—A General Framework for Stochastic and Hybrid Modelbased Diagnosis." Proc. DX 7 (2007): 162-169.
NDN Project [online], http://www.named-data.net/, Downloaded Mar. 9, 2015.
Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.
P. Mahadevan, E.Uzun, S. Sevilla, and J. Garcia-Luna-Aceves, "CCN-krs: A key resolution service for ccn," in Proceedings of the 1st International Conference on Information-centric Networking, Ser. INC 14 New York, NY, USA: ACM, 2014, pp. 97-106. [Online]. Available: http://doi.acm.org/10.1145/2660129.2660154.

(56) References Cited

OTHER PUBLICATIONS

R. H. Deng, J. Weng, S. Liu, and K. Chen. Chosen-Ciphertext Secure Proxy Re-Encryption without Pairings. CANS. Spring Lecture Notes in Computer Science vol. 5339 (2008).
Rosenberg, J. "Interactive Connectivity Establishment (ICE): A Protocol for Network Address Translator (NAT) Traversal for Offer/Answer Protocols", Apr. 2010, pp. 1-117.
S. Chow, J. Weng, Y. Yang, and R. Deng. Efficient Unidirectional Proxy Re-Encryption. Progress in Cryptology—AFRICACRYPT 2010. Springer Berlin Heidelberg (2010).
S. Deering, "Multicast Routing in Internetworks and Extended LANs," Proc. ACM SIGCOMM '88, Aug. 1988.
S. Deering et al., "The PIM architecture for wide-area multicast routing," IEEE/ACM Trans. on Networking, vol. 4, No. 2, Apr. 1996.
S. Jahid, P. Mittal, and N. Borisov, "EASiER: Encryption-based access control in social network with efficient revocation," in Proc. ACM ASIACCS 2011, Hong Kong, China, Mar. 2011, pp. 411-415.
S. Kamara and K. Lauter, "Cryptographic cloud storage," in Proc. FC 2010, Tenerife, Canary Islands, Spain, Jan. 2010, pp. 136-149.
S. Kumar et al. "Peacock Hashing: Deterministic and Updatable Hashing for High Performance Networking," 2008, pp. 556-564.
S. Misra, R. Tourani, and N.E. Majd, "Secure content delivery in information-centric networks: Design, implementation, and analyses," in Proc. ACM SIGCOMM ICN 2013, Hong Kong, China, Aug. 2013, pp. 73-78.
S. Yu, C. Wang, K. Ren, and W. Lou, "Achieving secure, scalable, and fine-grained data access control in cloud computing," in Proc. IEEE INFOCOM 2010, San Diego, CA, USA, Mar. 2010, pp. 1-9.
S.J. Lee, M. Gerla, and C. Chiang, "On-demand Multicast Routing Protocol in Multihop Wireless Mobile Networks," Mobile Networks and Applications, vol. 7, No. 6, 2002.
Sandvine, Global Internet Phenomena Report—Spring 2012. Located online at http://www.sandvine.com/downloads/ documents/Phenomenal H 2012/Sandvine Global Internet Phenomena Report 1H 2012.pdf.
Scalable and Adaptive Internet Solutions (SAIL) Project [online], http://sail-project.eu/ Downloaded Mar. 9, 2015.
Schein, Jeffrey, and Steven T. Bushby. A Simulation Study of a Hierarchical, Rule-Based Method for System-Level Fault Detection and Diagnostics in HVAC Systems. US Department of Commerce,[Technology Administration], National Institute of Standards and Technology, 2005.
Shani, Guy, Joelle Pineau, and Robert Kaplow. "A survey of point-based POMDP solvers." Autonomous Agents and Multi-Agent Systems 27.1 (2013): 1-51.
Sheppard, John W., and Stephyn GW Butcher. "A formal analysis of fault diagnosis with d-matrices." Journal of Electronic Testing 23.4 (2007): 309-322.
Shih, Eugene et al., 'Wake on Wireless: An Event Driven Energy Saving Strategy for Battery Operated Devices', Sep. 23, 2002, pp. 160-171.
Shneyderman, Alex et al., 'Mobile VPN: Delivering Advanced Services in Next Generation Wireless Systems', Jan. 1, 2003, pp. 3-29.
Solis, Ignacio, and J. J. Garcia-Luna-Aceves. 'Robust content dissemination in disrupted environments.' proceedings of the third ACM workshop on Challenged networks. ACM, 2008.
Sun, Ying, and Daniel S. Weld. "A framework for model-based repair." AAAI. 1993.
T. Ballardie, P. Francis, and J. Crowcroft, "Core Based Trees (CBT)," Proc. ACM SIGCOMM '88, Aug. 1988.
T. Dierts, "The transport layer security (TLS) protocol version 1.2," IETF RFC 5246, 2008.
T. Koponen, M. Chawla, B.-G. Chun, A. Ermolinskiy, K.H. Kim, S. Shenker, and I. Stoica, 'A data-oriented (and beyond) network architecture,' ACM SIGCOMM Computer Communication Review, vol. 37, No. 4, pp. 181-192, Oct. 2007.
The Despotify Project (2012). Available online at http://despotify.sourceforge.net/.
V. Goyal, 0. Pandey, A. Sahai, and B. Waters, "Attribute-based encryption for fine-grained access control of encrypted data," in Proc. ACM CCS 2006, Alexandria, VA, USA, Oct.-Nov. 2006, pp. 89-98.
V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.
V. K. Adhikari, S. Jain, Y. Chen, and Z.-L. Zhang. Vivisecting Youtube:An Active Measurement Study. In INFOCOM12 Mini-conference (2012).
Verma, Vandi, Joquin Fernandez, and Reid Simmons. "Probabilistic models for monitoring and fault diagnosis." The Second IARP and IEEE/RAS Joint Workshop on Technical Challenges for Dependable Robots in Human Environments. Ed. Raja Chatila. Oct. 2002.
Vijay Kumar Adhikari, Yang Guo, Fang Hao, Matteo Varvello, Volker Hilt, Moritz Steiner, and Zhi-Li Zhang. Unreeling Netflix: Understanding and Improving Multi-CDN Movie Delivery. In the Proceedings of IEEE INFOCOM 2012 (2012).
Vutukury, Srinivas, and J. J. Garcia-Luna-Aceves. A simple approximation to minimum-delay routing. vol. 29. No. 4. ACM, 1999.
W.-G. Tzeng and Z.-J. Tzeng, "A public-key traitor tracing scheme with revocation using dynamic shares," in Proc. PKC 2001, Cheju Island, Korea, Feb. 2001, pp. 207-224.
Waldvogel, Marcel "Fast Longest Prefix Matching: Algorithms, Analysis, and Applications", A dissertation submitted to the Swiss Federal Institute of Technology Zurich, 2002.
Walker, Iain S. Best practices guide for residential HVAC Retrofits. No. LBNL-53592. Ernest Orlando Lawrence Berkeley National Laboratory, Berkeley, CA (US), 2003.
Wang, Jiangzhe et al., "DMND: Collecting Data from Mobiles Using Named Data", Vehicular Networking Conference, 2010 IEEE, pp. 49-56.
Xylomenos, George, et al. "A survey of information-centric networking research." Communications Surveys & Tutorials, IEEE 16.2 (2014): 1024-1049.
Yi, Cheng, et al. 'A case for stateful forwarding plane.' Computer Communications 36.7 (2013): 779-791.
Yi, Cheng, et al. 'Adaptive forwarding in named data networking.' ACM SIGCOMM computer communication review 42.3 (2012): 62-67.
Zahariadis, Theodore, et al. "Trust management in wireless sensor networks." European Transactions on Telecommunications 21.4 (2010): 386-395.
Zhang, et al., "Named Data Networking (NDN) Project", http://www.parc.com/publication/2709/named-data-networking-ndn-project.html, Oct. 2010, NDN-0001, PARC Tech Report.
Zhang, Lixia, et al. 'Named data networking.' ACM SIGCOMM Computer Communication Review 44.3 {2014}: 66-73.
Soh et al., "Efficient Prefix Updates for IP Router Using Lexicographic Ordering and Updateable Address Set", Jan. 2008, IEEE Transactions on Computers, vol. 57, No. 1.
Beben et al., "Content Aware Network based on Virtual Infrastructure", 2012 13th ACIS International Conference on Software Engineering.
Biradar et al., "Review of multicast routing mechanisms in mobile ad hoc networks", Aug. 16, Journal of Network$.
D. Trossen and G. Parisis, "Designing and realizing and information-centric internet," IEEE Communications Magazine, vol. 50, No. 7, pp. 60-67, Jul. 2012.
Garcia-Luna-Aceves et al., "Automatic Routing Using Multiple Prefix Labels", 2012, IEEE, Ad Hoc and Sensor Networking Symposium.
Gasti, Paolo et al., 'DoS & DDoS in Named Data Networking', 2013 22nd International Conference on Computer Communications and Networks (ICCCN), Aug. 2013, pp. 1-7.
Ishiyama, "On the Effectiveness of Diffusive Content Caching in Content-Centric Networking", Nov. 5, 2012, IEEE, Information and Telecommunication Technologies (APSITT), 2012 9th Asia-Pacific Symposium.
J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.

(56) References Cited

OTHER PUBLICATIONS

J. Lotspiech, S. Nusser, and F. Pestoni. Anonymous Trust: Digital Rights Management using Broadcast Encryption. Proceedings of the IEEE 92.6 (2004).
Kaya et al., "A Low Power Lookup Technique for Multi-Hashing Network Applications", 2006 IEEE Computer Society Annual Symposium on Emerging VLSI Technologies and Architectures, Mar. 2006.
S. Kamara and K. Lauter. Cryptographic Cloud Storage. Financial Cryptography and Data Security. Springer Berlin Heidelberg (2010).
Wetherall, David, "Active Network vision and reality: Lessons form a capsule-based system", ACM Symposium on Operating Systems Principles, Dec. 1, 1999. pp. 64-79.
Kulkarni A.B. et al., "Implementation of a prototype active network", IEEE, Open Architectures and Network Programming, Apr. 3, 1998, pp. 130-142.
RTMP (2009). Available online at http://wwwimages.adobe.com/www.adobe.com/content/dam/Adobe/en/devnet/rtmp/ pdf/rtmp specification 1.0.pdf.
Hoque et al., "NLSR: Named-data Link State Routing Protocol", Aug. 12, 2013, ICN'13.
Nadeem Javaid, "Analysis and design of quality link metrics for routing protocols in Wireless Networks", PhD Thesis Defense, Dec. 15, 2010, Universete Paris-Est.
Xie et al. "Collaborative Forwarding and Caching in Content Centric Networks", Networking 2012.
Lui et al. (A TLV-Structured Data Naming Scheme for Content-Oriented Networking, pp. 5822-5827, International Workshop on the Network of the Future, Communications (ICC), 2012 IEEE International Conference on Jun. 10-15, 2012).
Peter Dely et al. "OpenFlow for Wireless Mesh Networks" Computer Communications and Networks, 2011 Proceedings of 20th International Conference on, IEEE, Jul. 31, 2011 (Jul. 31, 2011), pp. 1-6.
Garnepudi Parimala et al "Proactive, reactive and hybrid multicast routing protocols for Wireless Mesh Networks", 2013 IEEE International Conference on Computational Intelligence and Computing Research, IEEE, Dec. 26, 2013, pp. 1-7.
Tiancheng Zhuang et al. "Managing Ad Hoc Networks of Smartphones", International Journal of Information and Education Technology, Oct. 1, 2013.
Amadeo et al. "Design and Analysis of a Transport-Level Solution for Content-Centric Centric VANETs", University "Mediterranea" of Reggio Calabria, Jun. 15, 2013.
Marc Mosko: "CCNx 1.0 Protocol Introduction" Apr. 2, 2014 [Retrieved from the Internet Jun. 8, 2016] http://www.ccnx.org/pubs/hhg/1.1%20CCNx%201.0%20Protocol%20Introduction.pdf *paragraphs [01.3], [002], [02.1], [0003].
Akash Baid et al: "Comparing alternative approaches for networking of named objects in the future Internet", Computer Communications Workshops (Infocom Wkshps), 2012 IEEE Conference on, IEEE, Mar. 25, 2012, pp. 298-303, *Paragraph [002]* *figure 1*.
Priya Mahadevan: "CCNx 1.0 Tutorial", Mar. 16, 2014, pp. 1-11, Retrieved from the Internet: http://www.ccnx.org/pubs/hhg/1.2%20CCNx%201.0%20Tutorial.pdf [retrieved on Jun. 8, 2016] *paragraphs [003]-[006], [0011], [0013]* *figures 1,2*.
Marc Mosko et al "All-In-One Streams for Content Centric Networks", May 24, 2015, retrieved from the Internet: http://www.ccnx.org/pubs/AllinOne.pdf [downloaded Jun. 9, 2016] *the whole document*.
Cesar Ghali et al. "Elements of Trust in Named-Data Networking", Feb. 13, 2014 Retrieved from the internet Jun. 17, 2016 http://arxiv.org/pdf/1402.3332v5.pdf *p. 5, col. 1* *p. 2, col. 1-2* *Section 4.1; p. 4, col. 2* *Section 4.2; p. 4, col. 2*.
Priya Mahadevan et al. "CCN-KRS", Proceedings of the 1st International Conference on Information-Centric Networking, Inc. '14, Sep. 24, 2014.
Flavio Roberto Santos Et al. "Funnel: Choking Polluters in BitTorrent File Sharing Communities", IEEE Transactions on Network and Service Management, IEEE vol. 8, No. 4, Dec. 1, 2011.
Liu Wai-Xi et al: "Multisource Dissemination in content-centric networking", 2013 Fourth International conference on the network of the future (NOF), IEEE, Oct. 23, 2013, pp. 1-5.
Marie-Jose Montpetit et al.: "Network coding meets information-centric networking", Proceedings of the 1st ACM workshop on emerging Name-Oriented mobile networking design, architecture, algorithms, and applications, NOM '12, Jun. 11, 2012, pp. 31-36.
Asokan et al.: "Server-Supported Signatures", Computer Security Esorics 96, Sep. 25, 1996, pp. 131-143, Section 3.
Mandl et al.: "A Fast FPGA Based Coprocessor Supporting Hard Real-Time Search", New Frontiers of Information Technology, Proceedings of the 23rd Euromicro Conference Budapest, Sep. 1, 1997, pp. 499-506 *The Whole Document*.
Sun et al.: "Content-Based Route Lookup Using CAMs", Global Communications Conference, IEEE, Dec. 3, 2012 *The Whole Document*.

\* cited by examiner

PENDING INTEREST TABLE (PIT)
400

| Name | Ingress Face | Egress Face |
|---|---|---|
| Int 1 | Face A | Face B |
| Int 2 | Face C | Face B |
| Int 3 | Face B | Face A |
| ⋮ | ⋮ | ⋮ |

FIG. 4

METHOD AND APPARATUS FOR PREVENTING INSERTION OF MALICIOUS CONTENT AT A NAMED DATA NETWORK ROUTER

BACKGROUND

Field

This disclosure is generally related to computer networks. More specifically, this disclosure is related to controlling the flow of Content Objects over a Named Data Network.

Related Art

In a content centric network (CCN), a client device can obtain data by disseminating an Interest message that includes a name for this data. Routers along the CCN store a reverse path for the Interest, and propagate this Interest toward a content producer that can provide the requested data. Once the content producer returns a Content Object that satisfies the Interest, the routers forward the Content Object to the client device along the reverse path.

Unfortunately, it may be possible for a malicious entity to inject malicious data into the Interest's reverse path. To prevent malicious data from being returned to the client device, some routers may perform cryptographic authentication operations on the Content Objects to authenticate the Content Objects or their senders. However, performing this cryptographic authentication on every Content Object can significantly diminish the runtime performance of these routers.

SUMMARY

One embodiment provides an object-forwarding device that blocks a malicious Content Object from being inserted into an Interest's reverse path over a named data network. During operation, the device can receive a Content Object via a first interface, and can perform a lookup operation in a Pending Interest Table (PIT) to identify a PIT entry for an Interest associated with the Content Object. The device then determines, from the PIT entry, an egress interface used to forward the Interest. If the device determines that the egress interface of the PIT entry matches the first interface for the Content Object, the device forwards the Content Object via a return interface specified in the PIT entry. On the other hand, if the egress interface of the PIT entry does not match the first interface for the Content Object, the device can block the Content Object.

In some embodiments, the egress interface includes a physical interface.

In some embodiments, the egress interface includes a virtual interface.

In some variations to these embodiments, the virtual interface is associated with a Conjunctive Normal Form (CNF) expression that describes a logical relationship for a set of interfaces.

In some embodiments, the device can receive a second Interest via a second interface, and performs a lookup operation in a Forwarding Information Base, based on the second Interest's name, to determine an egress interface for forwarding the second Interest. Once the device forwards the second Interest via the egress interface, the device can create a new entry in the PIT for the Interest. This new PIT entry can include the egress interface used to forward the Interest.

In some embodiments, while performing the lookup operation in the PIT, the device determines whether a hierarchically structured variable-length identifier (HSVLI) of the PIT entry matches the Interest's name.

In some embodiments, the PIT entry includes a name field storing a hash value. Also, while performing the lookup operation in the PIT, the device determines whether the PIT entry's hash value matches a hash of the Interest's name.

BRIEF DESCRIPTION OF THE FIGURES

FIG. 4 illustrates an exemplary Pending Interest Table in accordance with an embodiment.

In the figures, like reference numerals refer to the same figure elements.

DETAILED DESCRIPTION

Figure 1:
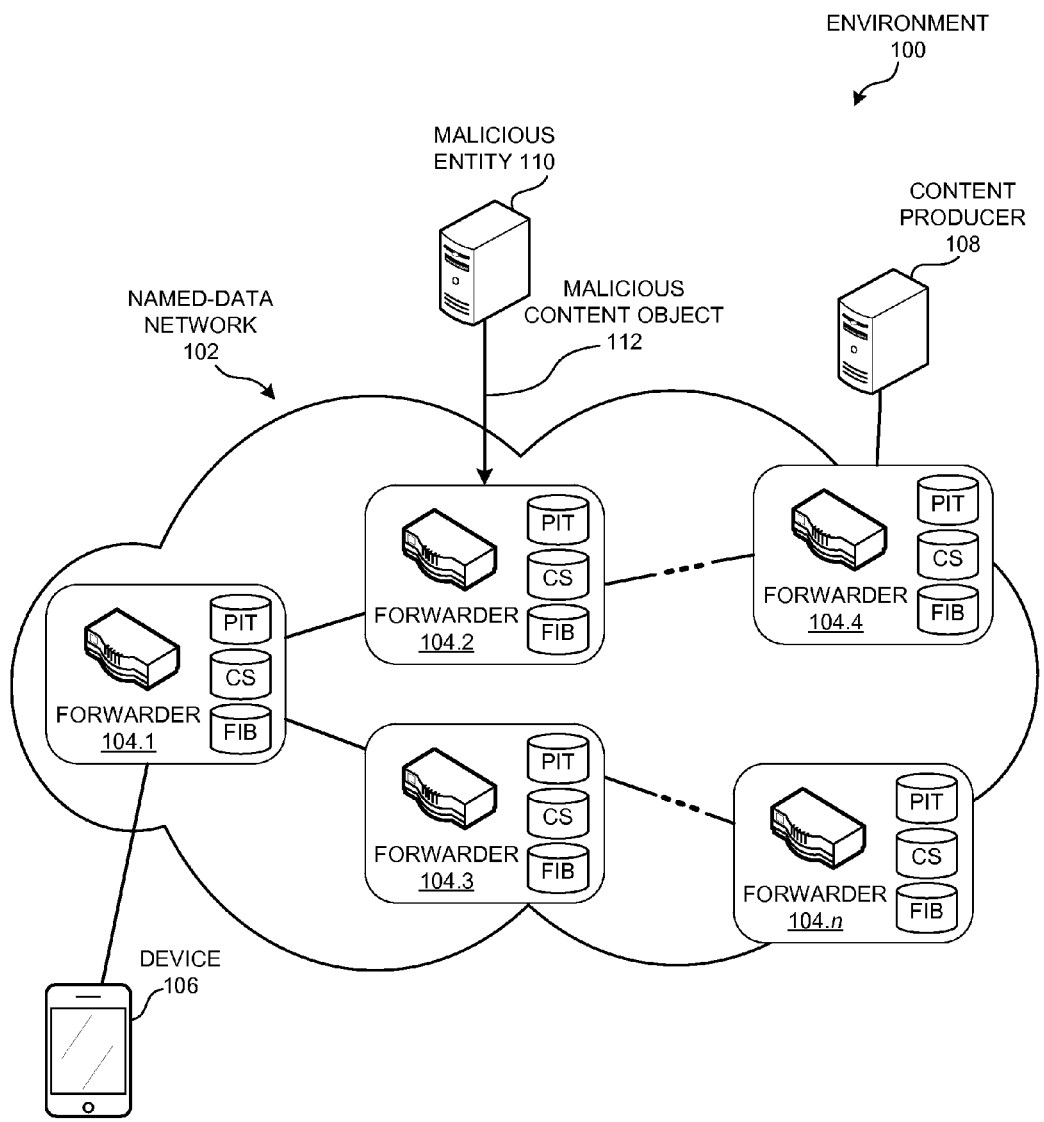
FIG. 1 illustrates a computing environment that facilitates blocking a malicious Content Object from being inserted into an Interest's reverse path over a named data network in accordance with an embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a router that solves the problem of preventing malicious entities from injecting malicious data into a data stream over a named data network (NDN). For example, a client device can obtain data over the NDN by disseminating an Interest message that includes a name for this data, which establishes a reverse path along routers to a content producer that can provide the requested data. It is possible for other network devices to "inject" malicious data into this reverse path by forwarding Content Objects that include the Interest's name to a router along the reverse path. Hence, a malicious entity may exploit this vulnerability to provide fraudulent data to clients that access an online service, or even to the online service itself.

If the malicious entity succeeds in injecting malicious data at a router along the reverse path, this router discards the reverse path information it has for the Interest since the router is no longer expecting to receive a Content Object for the Interest. If the router receives a Content Object from the online service after discarding the reverse path information, the router will effectively block the Content Object given that the reverse path information no longer exists. Hence, the malicious entity may also exploit this vulnerability to implement a denial-of-service (DoS) attack by preventing clients of the online service from receiving data from the online service.

In some embodiments, a router of the NDN can prevent a malicious entity from injecting data into a pending Interest's reverse path by keeping track of which egress interface was used to forward an Interest, and only returning a Content Object that is received via its corresponding Interest's interface. For example, the NDN router can store this egress interface in a Pending Interest Table (PIT). This way, when the router performs a lookup operation on the PIT based on a Content Object's name, the router can obtain a PIT entry that includes the egress interface that was used to forward the corresponding Interest, along with a return interface that is to be used to forward the Content Object. If the Content Object was not received via the Interest's egress interface, the router can block the Content Object as it may have been maliciously inserted into the reverse path. Otherwise, the router can proceed to return the Content Object via the return interface as usual.

The following terms describe elements of a named data network (NDN) architecture, such as a content-centric network (CCN):

Content Object: A single piece of named data, which is bound to a unique name. Content Objects are "persistent," which means that a Content Object can move around within a computing device, or across different computing devices, but does not change. If any component of the Content Object changes, the entity that made the change creates a new Content Object that includes the updated content, and binds the new Content Object to a new unique name.

Name: A name in an NDN is typically location independent and uniquely identifies a Content Object. A data-forwarding device can use the name or name prefix to forward an Interest packet toward a network node that generates or stores the Content Object, regardless of a network address or physical location for the Content Object. In some embodiments, the name may be a hierarchically structured variable-length identifier (HSVLI). The HSVLI can be divided into several hierarchical components, which can be structured in various ways. For example, the individual name components parc, home, ndn, and test.txt can be structured in a left-oriented prefix-major fashion to form the name "/parc/home/ndn/test.txt." Thus, the name "/parc/home/ndn" can be a "parent" or "prefix" of "/parc/home/ndn/test.txt." Additional components can be used to distinguish between different versions of the content item, such as a collaborative document.

In some embodiments, the name can include a non-hierarchical identifier, such as a hash value that is derived from the Content Object's data (e.g., a checksum value) and/or from elements of the Content Object's name. A description of a hash-based name is described in U.S. patent application Ser. No. 13/847,814 (entitled "ORDERED-ELEMENT NAMING FOR NAME-BASED PACKET FORWARDING," by inventor Ignacio Solis, filed 20 Mar. 2013), which is hereby incorporated by reference. A name can also be a flat label. Hereinafter, "name" is used to refer to any name for a piece of data in a name-data network, such as a hierarchical name or name prefix, a flat name, a fixed-length name, an arbitrary-length name, or a label (e.g., a Multiprotocol Label Switching (MPLS) label).

Interest: A packet that indicates a request for a piece of data, and includes a name (or a name prefix) for the piece of data. A data consumer can disseminate a request or Interest across an information-centric network, which NDN routers can propagate toward a storage device (e.g., a cache server) or a data producer that can provide the requested data to satisfy the request or Interest.

In some embodiments, the NDN system can include a content-centric networking (CCN) architecture. However, the methods disclosed herein are also applicable to other NDN or other information-centric network (ICN) architectures as well. A description of a CCN architecture is described in U.S. patent application Ser. No. 12/338,175 (entitled "CONTROLLING THE SPREAD OF INTERESTS AND CONTENT IN A CONTENT CENTRIC NETWORK," by inventors Van L. Jacobson and Diana K. Smetters, filed 18 Dec. 2008), which is hereby incorporated by reference.

FIG. 1 illustrates a computing environment 100 that facilitates blocking a malicious Content Object from being inserted into an Interest's reverse path over a named data network in accordance with an embodiment. Computing environment 100 can include a named-data network 102 (or any information-centric network now known or later developed), which can include a plurality of routing nodes or network nodes that can forward an Interest packet based on the name of the content being requested by the Interest packet, toward a content producer that can satisfy the Interest.

NDN 102 can include one or more forwarders 104 that can forward an Interest toward a content producer associated with the Interest's name prefix, and that can return a Content Object from the content producer along the Interest's reverse path. For example, a respective forwarder may be a router, a peer network device (e.g., a client device), or any network device in NDN 102. The forwarder can include a Forwarding Information Base (FIB) for determining an egress interface for an Interest, and can include a Content Store (CS) for caching Content Objects. The forwarder can also include a Pending Interest Table (PIT) for determining a return interface for returning a Content Object along its corresponding Interest's reverse path.

The PIT can also store an egress interface for an Interest, which the forwarder can use to perform a quick check as to whether a Content Object may be valid. Many forwarders 104 may not be able to properly authenticate the Content Object or its sender when they do not have the necessary keys. Also, some forwarders 104 may be configured to not perform cryptographic authentication on these Content Objects to avoid incurring the latencies associated with authentication. Hence, to perform the quick check, the forwarders can use the egress interface from the Interest's PIT entry to verify that the Content Object arrived through the same interface that was used to forward the Interest.

For example, computing environment 100 can include a client device 106, which can include a smartphone, a tablet computer, a personal computing device (e.g., a laptop), or any computing device that can disseminate Interests and receive Content Objects via NDN 102. After client device 106 disseminates an Interest, forwarders 104.1, 104.2, and 104.4 can forward the Interest toward a content producer 108 that can return a Content Object that satisfies this Interest. These forwarders update their PIT to include an interface for the Interest's reverse path, as well as an egress interface along for the Interest's the forward path.

As a further example, computing environment 100 can also include a malicious entity 110 that attempts to insert a malicious content object 112 into the Interest's reverse path at forwarder 104.2. Forwarder 104.2 can use the egress interface from the corresponding PIT entry to determine that malicious content object 112 was not received via the same interface that forwarder 104.2 used to forward the Interest (e.g., not the same as the interface to content producer 108).

Hence, the forwarders in NDN 102 can perform a quick interface-based check to block content that has been maliciously inserted into an Interest's reverse path. If a malicious Content Object happens to make it past these quick checks and arrives at device 106, it is still possible for device 106 to perform a definitive authentication operation to authenticate the Content Object or its sender. For example, device 106 can perform an authentication operation on malicious Content Object 112, and rejects Content Object 112 after determining that Malicious Entity 110 is not authorized to provide data for the Interest's name prefix.

Figure 2:
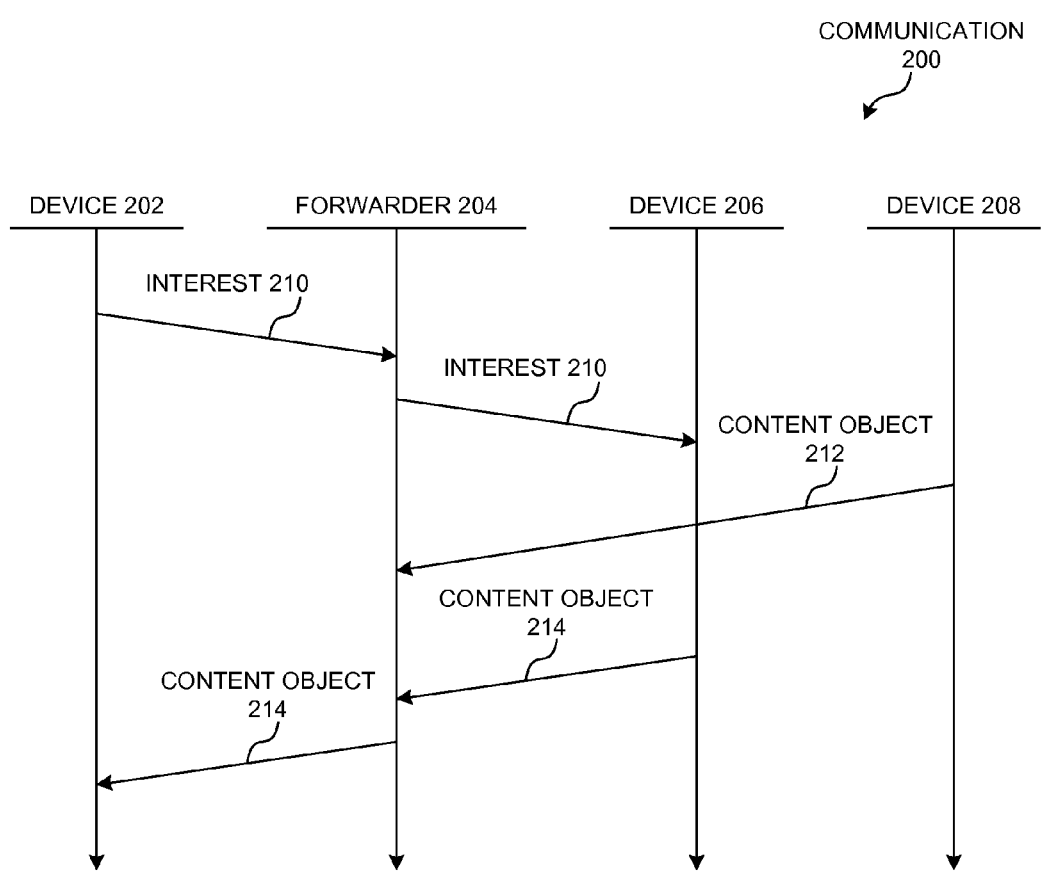
FIG. 2 illustrates exemplary communication for a forwarder that blocks a malicious Content Object from being inserted into an Interest's reverse path in accordance with an embodiment.

FIG. 2 illustrates exemplary communication for a forwarder that blocks a malicious Content Object from being inserted into an Interest's reverse path in accordance with an embodiment. During operation a client device 202 can disseminate an Interest 210 over the NDN. Interest 210 may arrive at a forwarder 204 (e.g., a router), which forwards Interest 210 to a device 206. After forwarding Interest 210, forwarder 204 can create an entry in a local PIT to store the Interest's ingress interface and egress interface in association with the Interest's name.

In some embodiments, a malicious device 208 may try to insert malicious data into the reverse path for Interest 210 by sending a Content Object 208, whose name matches that of Interest 210, to forwarder 204. At this point, forwarder 204 can perform a lookup operation in the PIT to determine whether a matching Interest was received. The lookup operation may return a PIT entry for Interest 210, which forwarder 204 uses to determine both the ingress interface and egress interface for Interest 210. However, upon determining that the interface from which forwarder 204 received Content Object 212 does not match the egress interface for Interface 210 (e.g., the egress interface to device 206), forwarder can block Content Object 212 and retains the matching PIT entry in the local PIT.

At a later time, device 206 can return a Content Object 206 that satisfies Interest 210 to forwarder 204. For example, device 206 may be a Content Producer that generates Content Object 206 locally or obtains Content Object 206 from a local repository. Alternatively, device 206 may include a router or forwarder that obtains Content Object 206 from another forwarder or a content producer, or from a content store (e.g., a local cache). After receiving Content Object 214, forwarder 204 can once again perform a lookup operation in the local PIT to obtain the PIT entry for Interest 210. This time, upon determining that the interface associated with Content Object 214 matches the egress interface for Interface 210, forwarder 204 proceeds to forward Content Object 214 to device 202, and removes the matching PIT entry in the local PIT.

Figure 3:
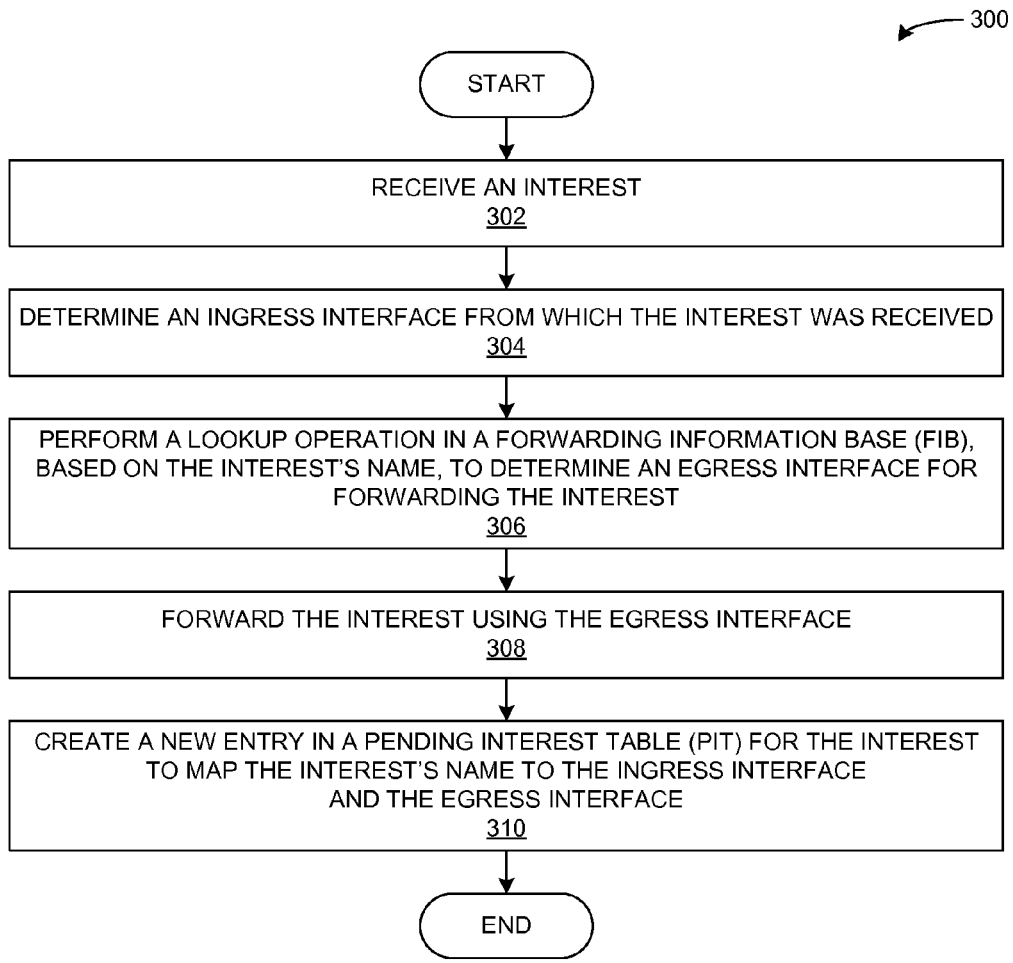
FIG. 3 presents a flow chart illustrating a method for creating an entry in a Pending Interest Table to map an Interest's name to an ingress interface and an egress interface for the Interest in accordance with an embodiment.

FIG. 3 presents a flow chart illustrating a method 300 for creating an entry in a Pending Interest Table to map an Interest's name to an ingress interface and an egress interface for the Interest in accordance with an embodiment. During operation, a router can receive an Interest (operation 302), and determines an ingress interface from which the router received the Interest (operation 304).

The router then performs a lookup operation in a Forwarding Information Base (FIB), using the Interest's name, to determine an egress interface for forwarding the Interest (operation 306). For example, the FIB can include a plurality of entries that each are associated with an HSVLI name or name prefix, or a hash-based name. The router can perform a longest prefix match lookup to select a FIB entry whose name provides a longest match to the Interest's name. This FIB entry maps the name prefix to a physical or virtual interface toward a content producer that can provide data that satisfies the Interest.

The router then forwards the Interest using the egress interface (operation 308), and creates a new entry in a local Pending Interest Table (PIT) for the Interest (operation 310). This new PIT entry maps the Interest's name to the Interest's ingress interface and egress interface (operation 312). The router can use the egress interface of this PIT entry to block malicious Content Objects with the Interest's name that arrive via a different interface.

In some embodiments, the new PIT entry's interfaces can include a physical interface, or can include a virtual interface that is associated with a Conjunctive Normal Form (CNF) expression that describes a logical relationship for a set of interfaces. For example, if the router forwards an Interest via multiple physical interfaces, the router can associate these multiple interfaces with one logical interface, and adds this logical interface to the PIT entry as the egress interface. This way, when the router receives the corresponding Content Object whose name matches the PIT entry's name, the router can check whether the physical interface from which the Content Object arrived satisfies the CNF expression for the PIT entry's logical egress interface.

FIG. 4 illustrates an exemplary Pending Interest Table 400 in accordance with an embodiment. Specifically, PIT 400 can include a plurality of rows that each corresponds to a PIT entry, and can include a name column 402, an ingress interface column 404, and an egress interface column 406. Name column 402 can include names for a set of pending Interests, such as an HSVLI or a hash-based name. Ingress interface column 404 includes interfaces from which Interests are received, and egress interface column 406 includes interfaces through which Interests were forwarded. Hence, a respective PIT entry maps a pending Interest's name to an ingress interface and an egress interface for the pending Interest.

In some embodiments, a PIT entry can include express header hashes. For example, name column 402 of a PIT entry can store a similarity hash for an Interest instead of an Interest's full name, and egress interface column 406 of the PIT entry can store one or more forwarding hashes for interfaces that were used to forward the Interest. Note that when storing the similarity hash in name column 402, it is possible for two pending Interests to map to the same similarity hash. Typically, in this situation, the router may use the first PIT entry that matches the similarity hash to return the Content Object. However, in some embodiments, the router improves the accuracy of the PIT lookup operation for express header hashes by only using a PIT entry to determine a return interface for a Content Object when the Content Object's name and interface match the PIT entry's similarity hash and forwarding hash.

Figure 5:
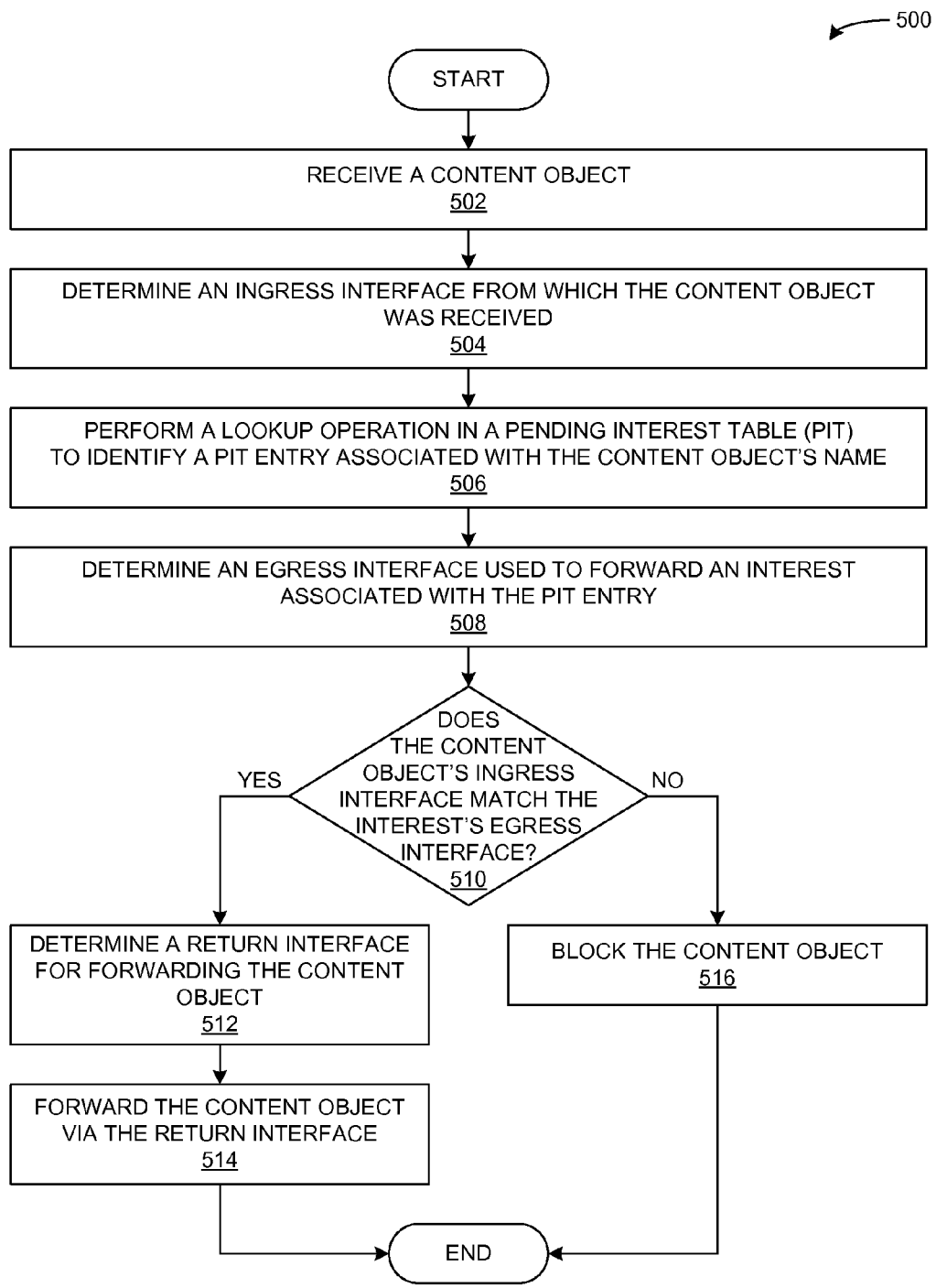
FIG. 5 presents a flow chart illustrating a method for determining whether to block or forward a Content Object based on a corresponding PIT entry in accordance with an embodiment.

FIG. 5 presents a flow chart illustrating a method 400 for determining whether to block or forward a Content Object based on a corresponding PIT entry in accordance with an embodiment. During operation, the router can receive a Content Object (operation 502), and determines an ingress interface from which the router received the Content Object (operation 504).

The router then performs a lookup operation in a local PIT to identify a PIT entry associated with the Content Object's name (operation 506). For example, the Content Object's name can include an HSVLI or a hash-based name. While performing the lookup operation, the router searches for a PIT entry with a name that exactly matches the Content Object's name. The router then determines, from the PIT entry, an egress interface that was used to forward an Interest associated with the PIT entry (operation 508).

The router then determines whether the Content Object's ingress interface matches the Interest's egress interface (operation 510). If so, the Content Object is possibly valid, and the router proceeds to return the Content Object along the Interest's reverse path. In doing so, the router can determine a return Interface from the PIT entry (operation 512), and forwards the Content Object via the return interface (operation 514).

However, if the Content Object's ingress interface does not match the Interest's egress interface, the Content Object is likely to include malicious data. Hence, the router blocks the Content Object (operation 516), for example, by discarding the Content Object without forwarding the Content Object along the reverse path. Note that when the router blocks the Content Object, the router does not remove the PIT entry that matches the Content Object's name. This allows the router to forward a valid Content Object along the Interest's reverse path at a later time.

Figure 6:
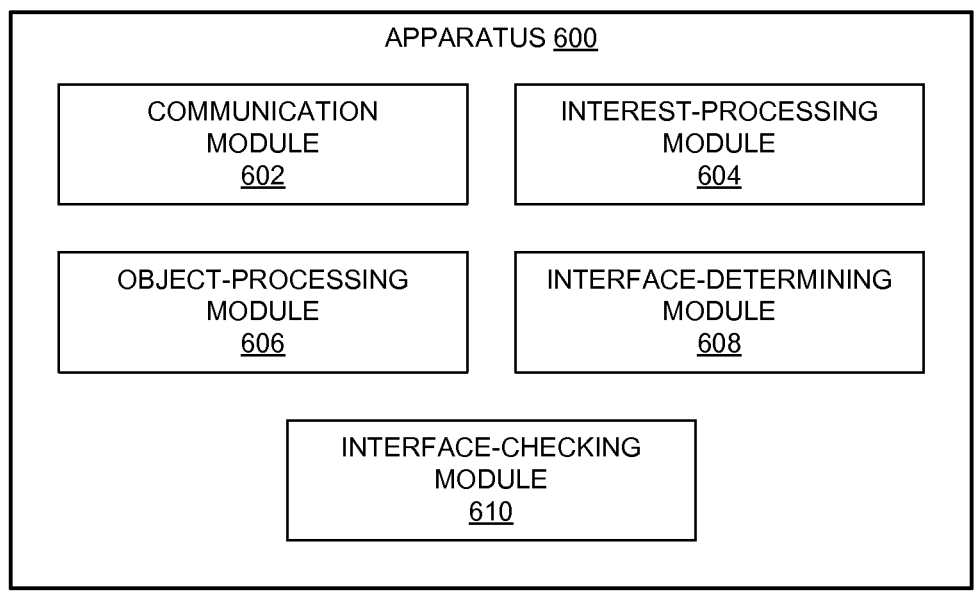
FIG. 6 illustrates an exemplary apparatus that facilitates blocking a malicious Content Object from being inserted into an Interest's reverse path in accordance with an embodiment.

FIG. 6 illustrates an exemplary apparatus 600 that facilitates blocking a malicious Content Object from being inserted into an Interest's reverse path in accordance with an embodiment. Apparatus 600 can comprise a plurality of modules which may communicate with one another via a wired or wireless communication channel. Apparatus 600 may be realized using one or more integrated circuits, and may include fewer or more modules than those shown in FIG. 6. Further, apparatus 600 may be integrated in a computer system, or realized as a separate device which is capable of communicating with other computer systems and/or devices. Specifically, apparatus 600 can comprise a communication module 602, an Interest-processing module 604, an object-processing module 606, an Interface-determining module 608, and an Interface-checking module 610.

In some embodiments, communication module 602 can receive an Interest via a first interface, and Interest-processing module 604 can perform a lookup operation in a FIB to determine an egress interface for forwarding the Interest. Interface-checking module 610 can create a new entry in the PIT for the Interest, which includes an ingress interface and the egress interface for the Interest.

Communication module 602 can also receive a Content Object via a second interface, and object-processing module 606 can perform a lookup operation in a PIT to identify a PIT entry for an Interest associated with the Content Object. Interface-determining module 608 can determine, from the PIT entry, an egress interface used to forward the Interest. Interface-checking module 610 can also determine whether the egress interface of the PIT entry matches the first interface for the Content Object.

Figure 7:
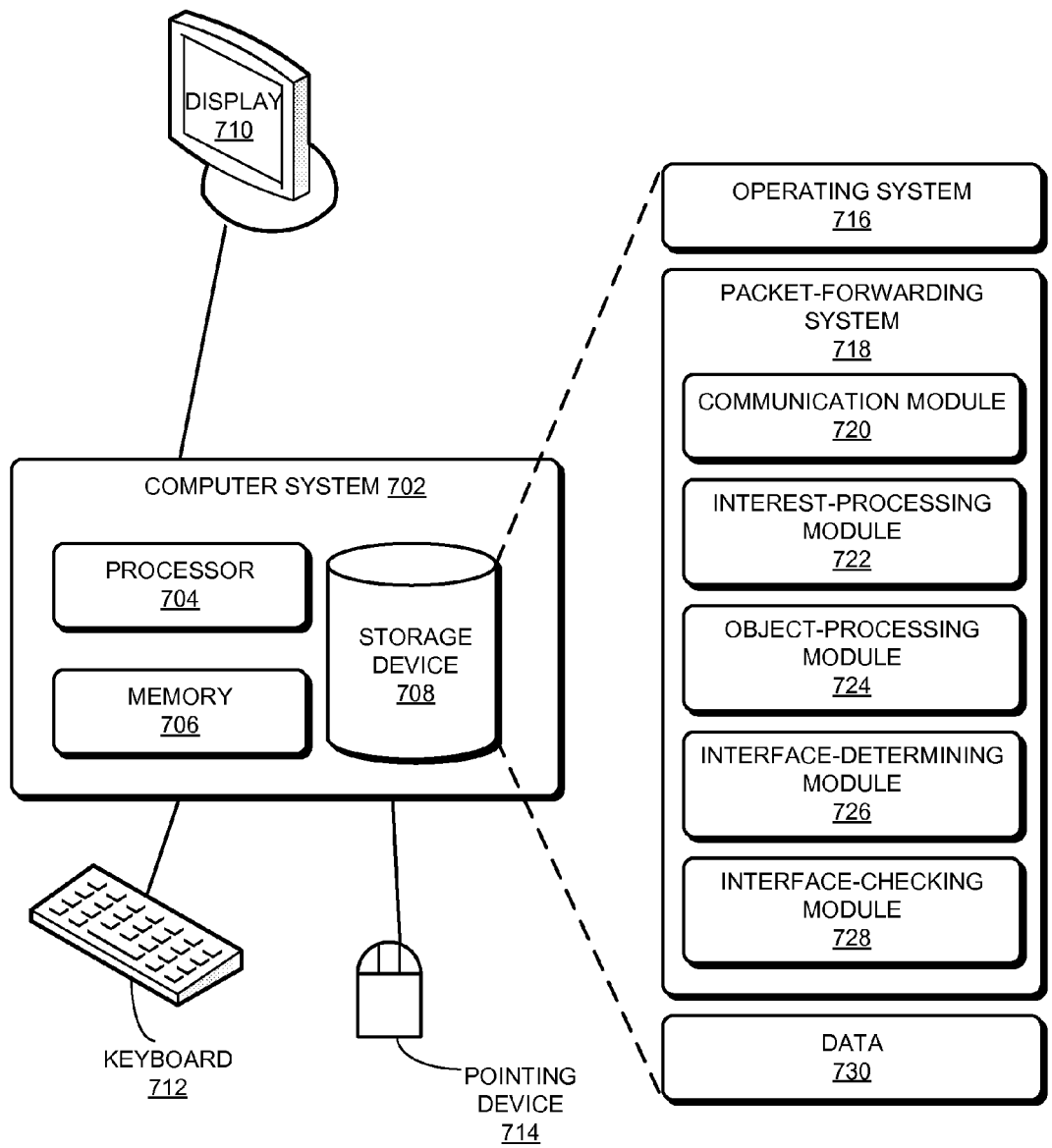
FIG. 7 illustrates an exemplary computer system that facilitates blocking a malicious Content Object from being inserted into an Interest's reverse path in accordance with an embodiment.

FIG. 7 illustrates an exemplary computer system 702 that facilitates blocking a malicious Content Object from being inserted into an Interest's reverse path in accordance with an embodiment. Computer system 702 includes a processor 704, a memory 706, and a storage device 708. Memory 706 can include a volatile memory (e.g., RAM) that serves as a managed memory, and can be used to store one or more memory pools. Furthermore, computer system 702 can be coupled to a display device 710, a keyboard 712, and a pointing device 714. Storage device 708 can store operating system 716, a packet-forwarding system 718, and data 730.

Packet-forwarding system 718 can include instructions, which when executed by computer system 702, can cause computer system 702 to perform methods and/or processes described in this disclosure. Specifically, packet-forwarding system 718 may include instructions for receiving an Interest or receiving a Content Object over a named data network (communication module 720). Further, packet-forwarding system 718 can include instructions for performing a lookup operation in a FIB to determine an egress interface for forwarding the Interest (Interest-processing module 722), and can include instructions for creating a new entry in the PIT for the Interest, which includes an ingress interface and the egress interface for the Interest (interface-checking module 728).

Packet-forwarding system 718 can include instructions for performing a lookup operation in a PIT to identify a PIT entry for an Interest associated with the Content Object (object-processing module 724). Packet-forwarding system 718 can also include instructions for determining, from the PIT entry, an egress interface used to forward the Interest (interface-determining module 726). Further, packet-forwarding system 718 can include instructions for determining whether the egress interface of the PIT entry matches the first interface for the Content Object (interface-checking module 728).

Data 730 can include any data that is required as input or that is generated as output by the methods and/or processes described in this disclosure.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method, comprising:
    forwarding, by a network node via an egress interface, an Interest specifying a location-independent, hierarchical, variable-length content name that identifies a first Content Object;
    storing, in a Pending Interest Table (PIT) within a data repository of the network node, a PIT entry for the Interest specifying the egress interface and a return interface;
    receiving, by the network node, a second Content Object associated with the same content name via a second interface;
    performing, based on the content name, a lookup operation in the PIT to identify the PIT entry for the previously forwarded Interest;
    determining, from the PIT entry, the egress interface used previously by the network node to forward the Interest; and
    responsive to determining that the egress interface specified by the PIT entry matches the second interface for the Content Object, forwarding the Content Object via the return interface specified in the PIT entry.

2. The method of claim 1, further comprising:
    responsive to determining that the egress interface specified by the PIT entry and used previously to forward the Interest differs from the second interface for the Content Object, blocking the Content Object from being forwarded via the return interface.

3. The method of claim 1, wherein the egress interface includes a physical interface.

4. The method of claim 1, wherein the egress interface includes a virtual interface.

5. The method of claim 4, wherein the virtual interface is associated with a Conjunctive Normal Form (CNF) expression that describes a logical relationship for a set of interfaces.

6. The method of claim 1, further comprising:
    receiving a second Interest via a third interface;
    performing a lookup operation in a Forwarding Information Base, based on the second Interest's name, to determine an egress interface for forwarding the second Interest; and
    responsive to forwarding the second Interest via the egress interface, creating a new entry in the PIT for the Interest, wherein the new PIT entry includes the egress interface used to forward the Interest.

7. The method of claim 1, wherein the PIT entry includes a name field storing one or more of:
    a hierarchically structured variable-length identifier (HS-VLI); and
    a hash value.

8. A non-transitory computer-readable storage medium storing instructions that when executed by a network node computer cause the network node computer to perform a method, the method comprising:
    forwarding, via an egress interface, an Interest specifying a location-independent, hierarchical, variable-length content name that identifies a first Content Object;
    storing, in a Pending Interest Table (PIT) within a data repository, a PIT entry for the Interest specifying the egress interface and a return interface;
    receiving a second Content Object associated with the same content name via a second interface;
    performing, based on the content name, a lookup operation in the PIT to identify the PIT entry for the previously forwarded Interest;
    determining, from the PIT entry, the egress interface used previously to forward the Interest; and
    responsive to determining that the egress interface specified by the PIT entry matches the second interface for the Content Object, forwarding the Content Object via the return interface specified in the PIT entry.

9. The storage medium of claim 8, further comprising:
    responsive to determining that the egress interface specified by the PIT entry and used previously to forward the Interest differs from the second interface for the Content Object, blocking the Content Object from being forwarded via the return interface.

10. The storage medium of claim 8, wherein the egress interface includes a physical interface.

11. The storage medium of claim 8, wherein the egress interface includes a virtual interface.

12. The storage medium of claim 11, wherein the virtual interface is associated with a Conjunctive Normal Form (CNF) expression that describes a logical relationship for a set of interfaces.

13. The storage medium of claim 8, further comprising:
    receiving a second Interest via a third interface;
    performing a lookup operation in a Forwarding Information Base, based on the second Interest's name, to determine an egress interface for forwarding the second Interest; and
    responsive to forwarding the second Interest via the egress interface, creating a new entry in the PIT for the Interest, wherein the new PIT entry includes the egress interface used to forward the Interest.

14. The storage medium of claim 8, wherein the PIT entry includes a name field storing one or more of:
    a hierarchically structured variable-length identifier (HS-VLI); and
    a hash value.

15. An apparatus, comprising:
    a forwarding module to forward, via an egress interface, an Interest specifying a location-independent, hierarchical, variable-length content name that identifies a first Content Object;
    an interface-storing module to store, in a Pending Interest Table (PIT) within a data repository, a PIT entry for the Interest specifying the egress interface and a return interface;
    a communication module to receive a second Content Object associated with the same content name via a second interface;
    an object-processing module to perform, based on the content name, a lookup operation in the PIT to identify the PIT entry for the previously forwarded Interest;
    an interface-determining module to determine, from the PIT entry, the egress interface used previously to forward the Interest;
    an interface-checking module to determine whether the egress interface specified by the PIT entry matches the second interface for the Content Object; and
    wherein responsive to the interface-checking module determining that the egress interface specified by the PIT entry matches the second interface for the Content Object, the communication module is further configured to forward the Content Object via the return interface specified in the PIT entry.

16. The apparatus of claim 15, wherein responsive to determining that the egress interface specified by the PIT entry and used previously to forward the Interest differs from the second interface for the Content Object, the communication module is further configured to block the Content Object from being forwarded via the return interface.

17. The apparatus of claim 15, wherein the egress interface includes a physical interface.

18. The apparatus of claim 15, wherein the egress interface includes a virtual interface.

19. The apparatus of claim 18, wherein the virtual interface is associated with a Conjunctive Normal Form (CNF) expression that describes a logical relationship for a set of interfaces.

20. The apparatus of claim 15, wherein the communication module is further configured to receive a second Interest via a third interface;
   wherein the apparatus further comprises an Interest-processing module to perform a lookup operation in a Forwarding Information Base, based on the second Interest's name, to determine an egress interface for forwarding the second Interest; and
   wherein the interface-checking module is further configured to create a new entry in the PIT for the Interest, wherein the new PIT entry includes the egress interface used to forward the Interest, responsive to the communication module forwarding the second Interest via the egress interface.

21. The apparatus of claim 15, wherein the PIT entry includes a name field storing one or more of:
   a hierarchically structured variable-length identifier (HS-VLI); and
   a hash value.

* * * * *